US012765566B2

(12) United States Patent
Choi et al.

(10) Patent No.: US 12,765,566 B2
(45) Date of Patent: Oct. 20, 2026

(54) CART TREATMENT SYSTEM

(71) Applicant: CJ CHEILJEDANG CORPORATION, Seoul (KR)

(72) Inventors: Chun Myung Choi, Seoul (KR); Gi Chang Lee, Seoul (KR); Seung Hoon Lee, Seoul (KR); Seung Ho Lee, Seoul (KR); Jae Gyoung Kim, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 300 days.

(21) Appl. No.: 18/684,528

(22) PCT Filed: Apr. 21, 2022

(86) PCT No.: PCT/KR2022/005737

§ 371 (c)(1),
(2) Date: Feb. 16, 2024

(87) PCT Pub. No.: WO2023/022325

PCT Pub. Date: Feb. 23, 2023

(65) Prior Publication Data

US 2025/0024844 A1 Jan. 23, 2025

(30) Foreign Application Priority Data

Aug. 19, 2021 (KR) ........................ 10-2021-0109762

(51) Int. Cl.

| | |
|---|---|
| ***A23B 2/00*** | (2025.01) |
| ***A23B 2/20*** | (2025.01) |
| ***B65G 47/52*** | (2006.01) |

(52) U.S. Cl.
CPC ................ *A23B 2/001* (2025.01); *A23B 2/20* (2025.01); *B65G 47/52* (2013.01)

(58) Field of Classification Search
CPC ............ A23B 2/001; A23B 2/20; B65G 47/52
See application file for complete search history.

(56) References Cited

U.S. PATENT DOCUMENTS 7,146,748 B2 * 12/2006 Swisher .................. F26B 21/50 34/106
7,346,956 B2 * 3/2008 Andre ..................... B08B 15/02 15/381

(Continued)

FOREIGN PATENT DOCUMENTS

EP 1236536 A1 9/2002
EP 3141083 B1 9/2020

(Continued)

OTHER PUBLICATIONS

Office Action issued in corresponding Japanese Patent Application No. 2024-510232, dated Nov. 14, 2024.

(Continued)

*Primary Examiner* — Saul Rodriguez
*Assistant Examiner* — Brendan P Tighe
(74) *Attorney, Agent, or Firm* — Morgan, Lewis & Bockius LLP

(57) ABSTRACT

The present disclosure provides a cart treatment system including a pre-treatment module for cart treatment; an intermediate module provided to receive and treat the cart which is treated in the pre-treatment module; and a post-treatment module provided to receive and treat the cart which is treated in the intermediate module.

13 Claims, 33 Drawing Sheets

(56) References Cited

U.S. PATENT DOCUMENTS

| | | | | |
|---|---|---|---|---|
| 8,047,555 | B2 | 11/2011 | Mann | |
| 9,561,296 | B1 * | 2/2017 | Sobhy | A61L 2/22 |
| 9,642,385 | B2 | 5/2017 | Tang et al. | |
| 9,961,926 | B2 | 5/2018 | Tang et al. | |
| 10,800,357 | B2 * | 10/2020 | Schreiner | B64D 11/02 |
| 11,140,913 | B2 | 10/2021 | Tang et al. | |
| 11,845,407 | B1 * | 12/2023 | van Zon | B60S 3/04 |
| 12,502,447 | B2 * | 12/2025 | Majdali | A61L 2/10 |
| 2005/0121057 | A1 | 6/2005 | Knowlton et al. | |
| 2009/0108552 | A1 | 4/2009 | Mann et al. | |
| 2016/0029685 | A1 | 2/2016 | Tang et al. | |
| 2016/0345613 | A1 | 12/2016 | Tang et al. | |
| 2018/0220682 | A1 | 8/2018 | Tang et al. | |
| 2020/0407643 | A1 | 12/2020 | Innocenti et al. | |
| 2025/0020214 | A1 * | 1/2025 | Choi | F16J 15/028 |
| 2025/0024844 | A1 * | 1/2025 | Choi | A23B 2/001 |

FOREIGN PATENT DOCUMENTS

| | | | |
|---|---|---|---|
| JP | H05146644 | A * | 6/1993 |
| JP | H07-265025 | A | 10/1995 |
| JP | 2549271 | B2 | 10/1996 |
| JP | H11-336915 | A | 12/1999 |
| JP | 3107306 | B1 | 11/2000 |
| JP | 2002-020803 | A | 1/2002 |
| JP | 2004-305001 | A | 11/2004 |
| JP | 2005-170421 | A | 6/2005 |
| JP | 3676494 | B2 | 7/2005 |
| JP | 4446522 | B2 | 4/2010 |
| JP | 3173987 | U | 3/2012 |
| JP | 4938410 | B2 | 5/2012 |
| JP | 5028377 | B2 | 9/2012 |
| JP | 3196974 | U | 4/2015 |
| JP | 6131238 | B2 | 5/2017 |
| JP | 2017-178350 | A | 10/2017 |
| JP | 6283926 | B2 | 2/2018 |
| JP | 6318445 | B2 | 5/2018 |
| JP | 2021-055290 | A | 4/2021 |
| JP | 2021-062972 | A | 4/2021 |
| KR | 20-1998-0021794 | U | 7/1998 |
| KR | 20-0337084 | Y1 | 12/2003 |
| KR | 20-0432139 | Y1 | 12/2006 |
| KR | 10-0821902 | B1 | 4/2008 |
| KR | 20-2009-0001544 | U | 2/2009 |
| KR | 10-0959388 | B1 | 5/2010 |
| KR | 10-2011-0016542 | A | 2/2011 |
| KR | 10-1534631 | B1 | 7/2015 |
| KR | 10-1598973 | B1 | 3/2016 |
| KR | 10-2016-0124276 | A | 10/2016 |
| KR | 10-1697355 | B1 | 2/2017 |
| KR | 10-1783407 | B1 | 9/2017 |
| KR | 10-2019-0107840 | A | 9/2019 |
| KR | 20-2019-0003106 | U | 12/2019 |
| WO | 2019-166980 | A1 | 9/2019 |

OTHER PUBLICATIONS

International Search Report issued in corresponding International Patent Application No. PCT/KR2022/005737 dated Aug. 11, 2022.
Extended European Search Report issued in corresponding European Patent Application No. 22858567.5, dated Jul. 2, 2025.

* cited by examiner

【Figure 1】
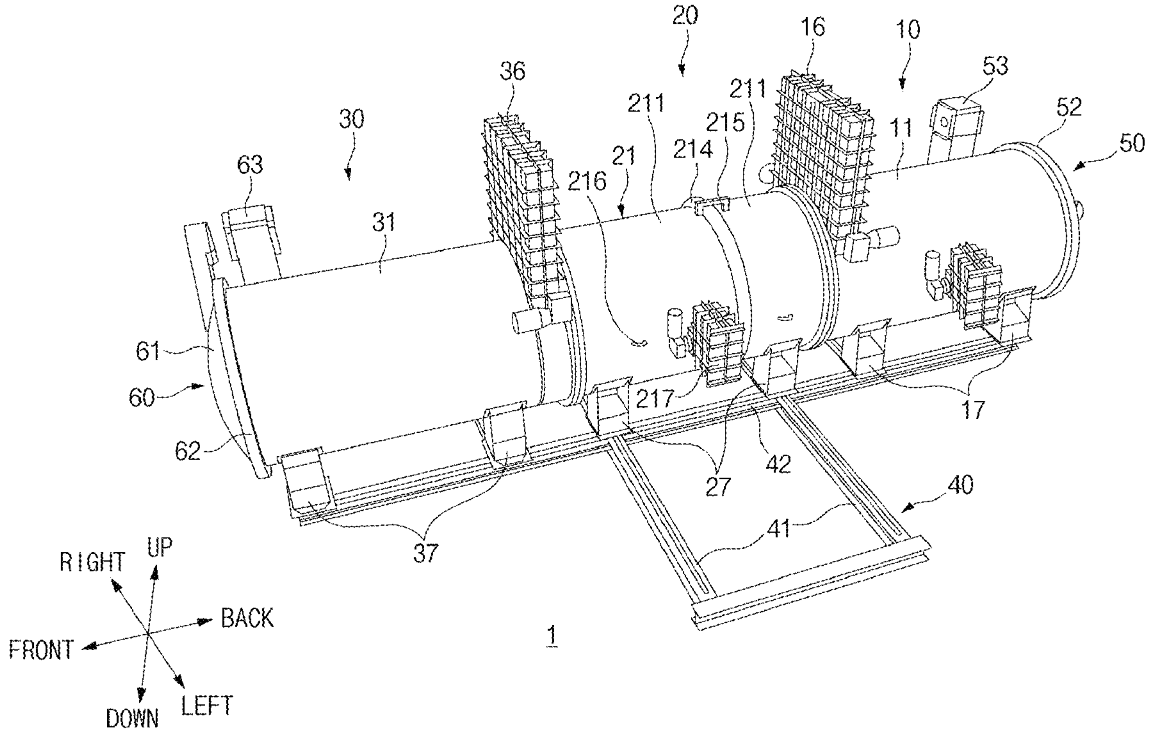

【Figure 2】
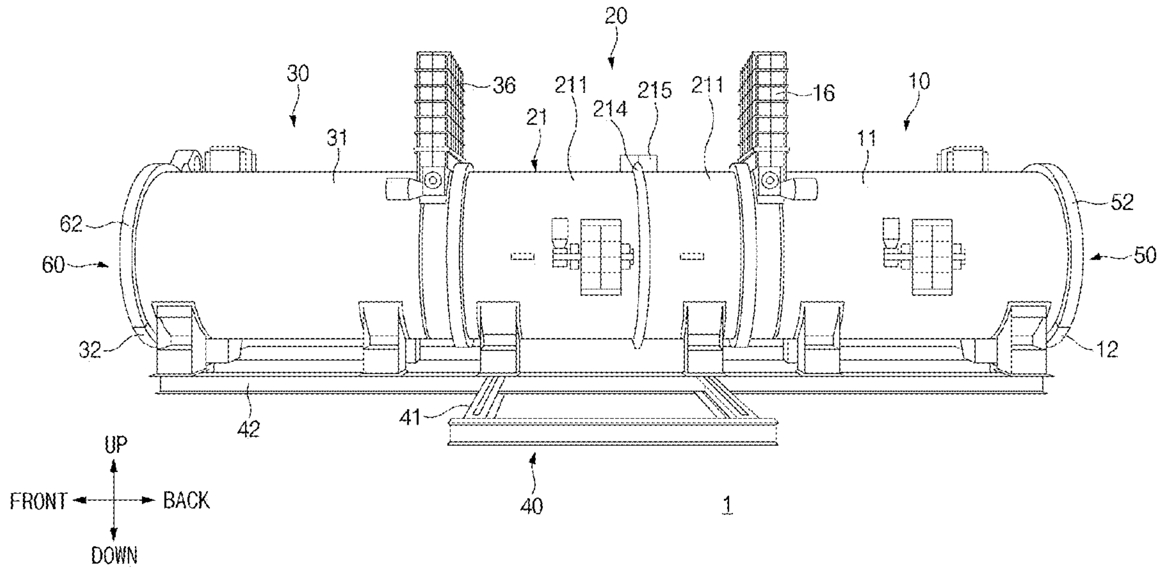

【Figure 3】
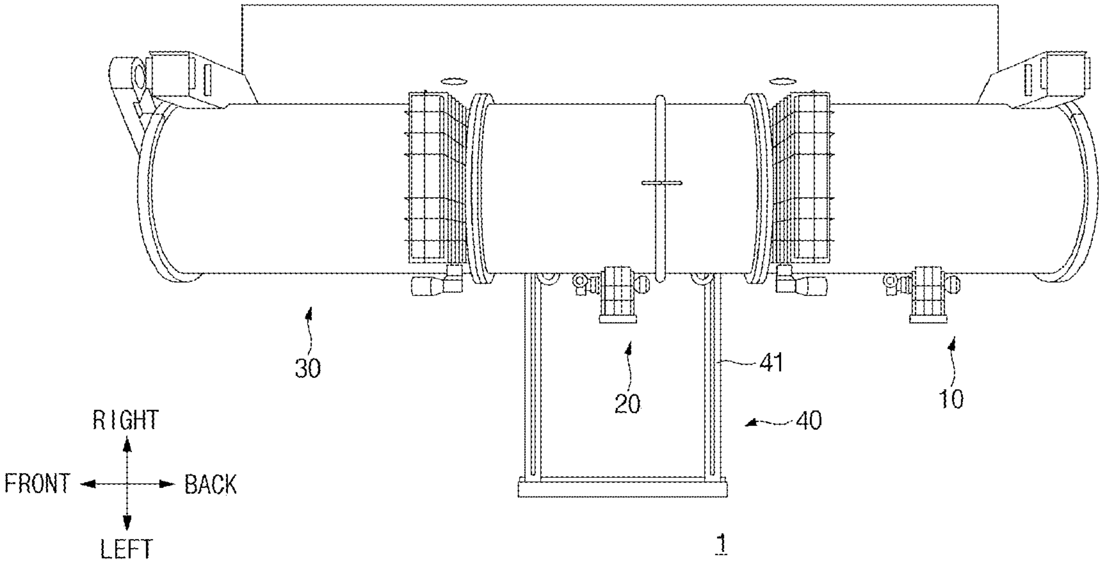

【Figure 4】
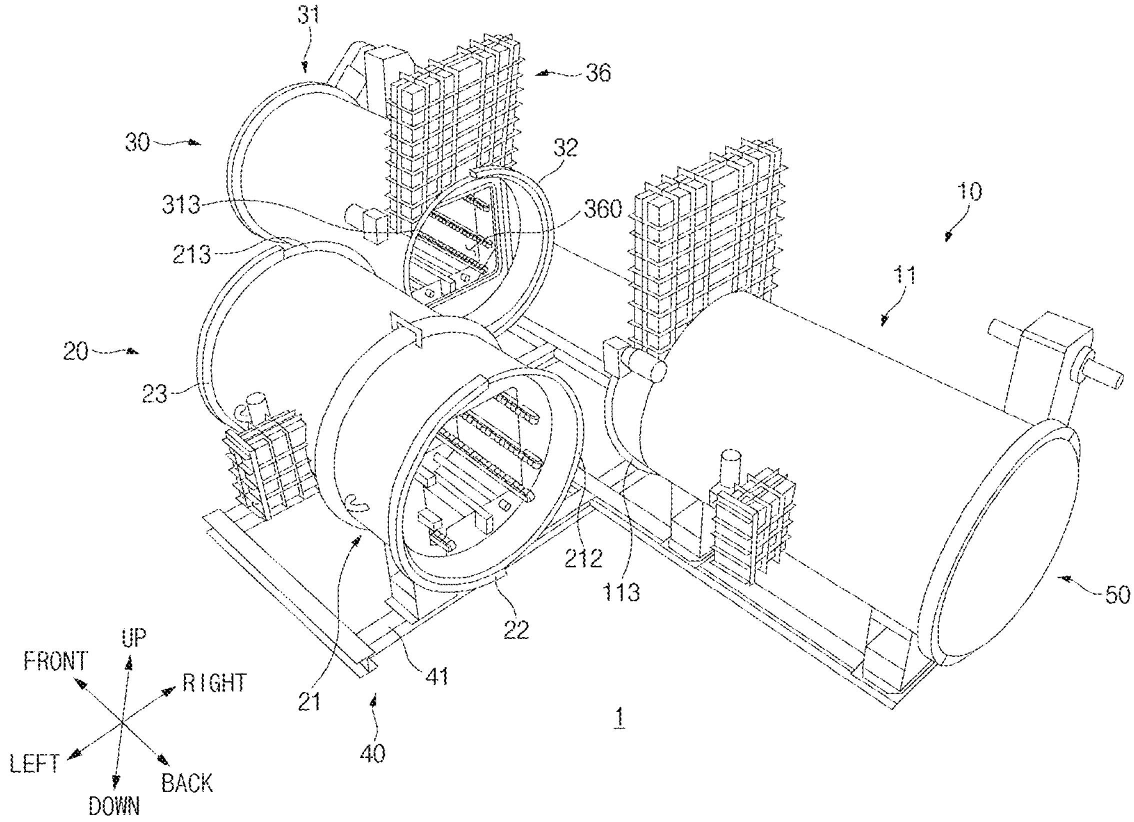

【Figure 5】
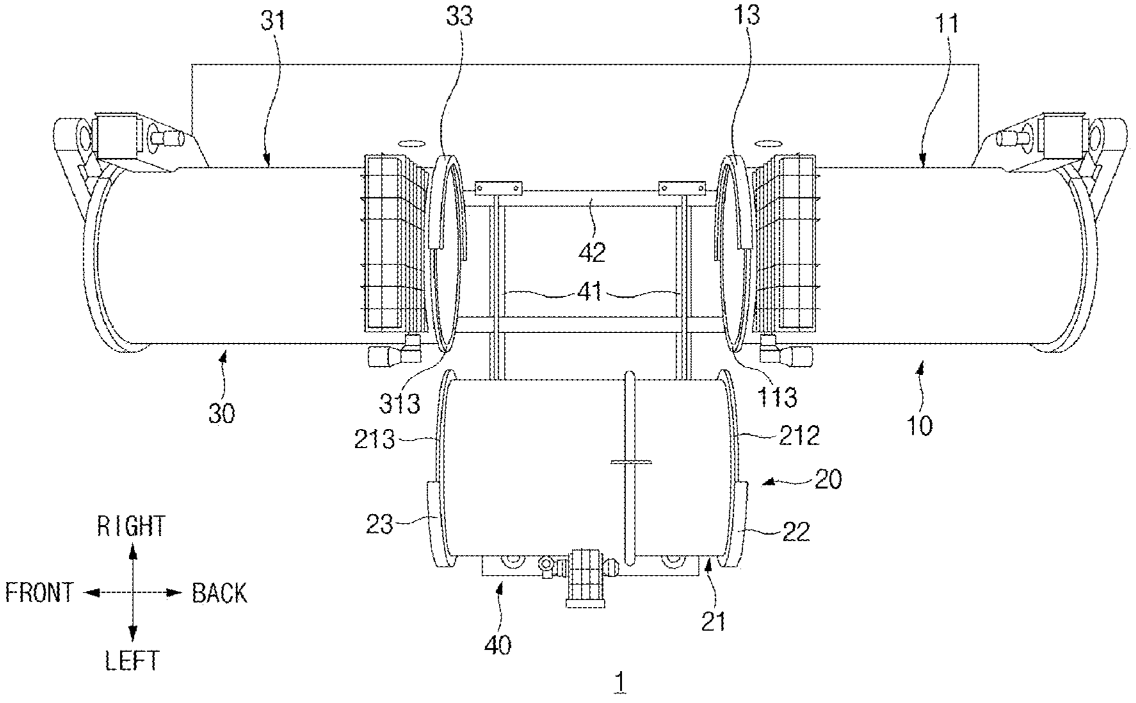

【Figure 6】
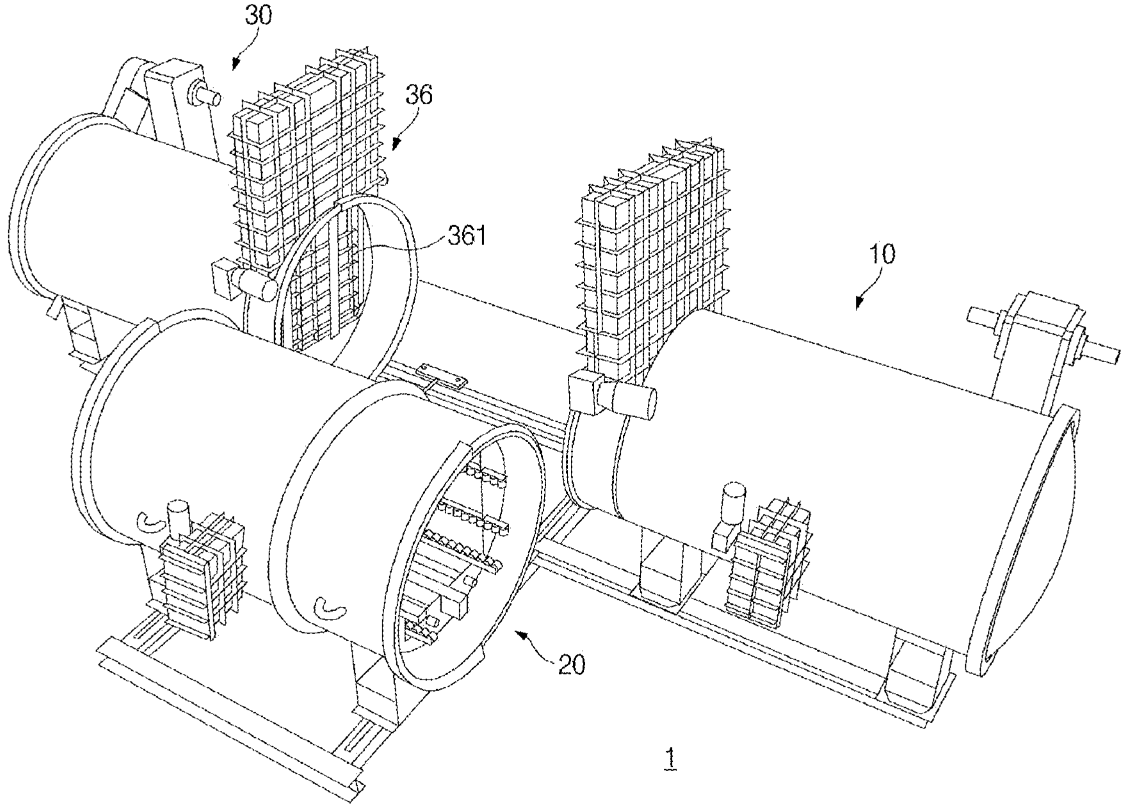

【Figure 7】
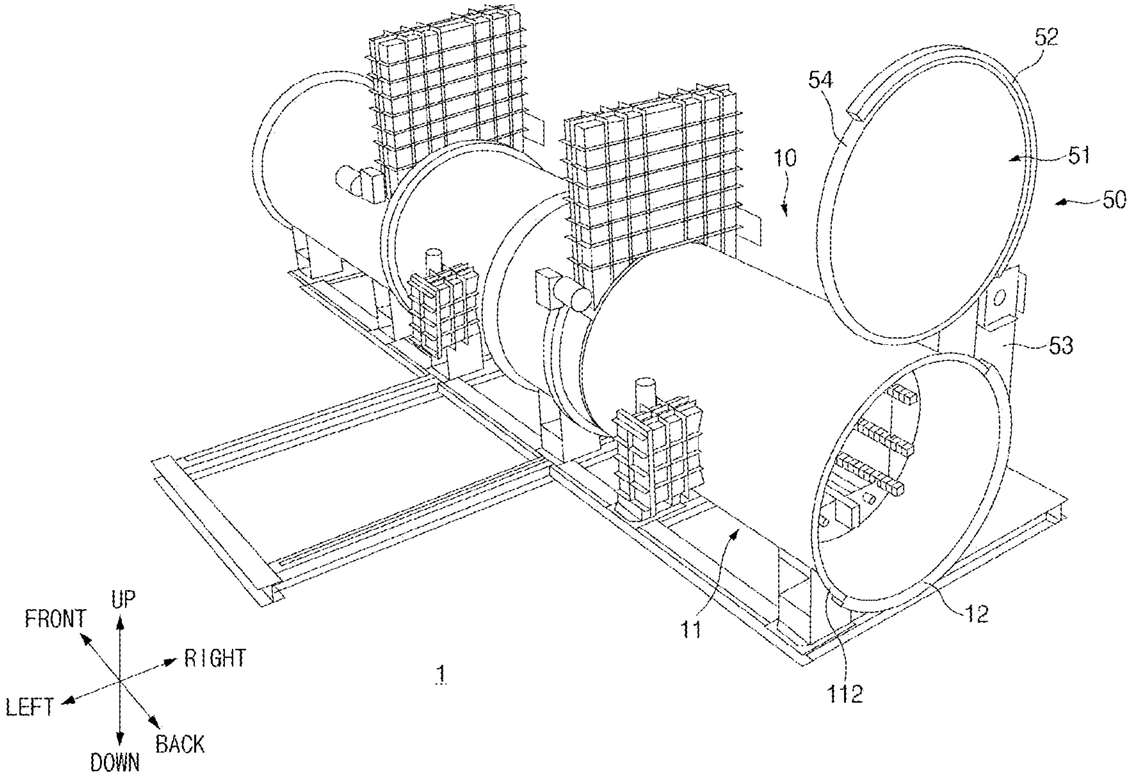

【Figure 8】
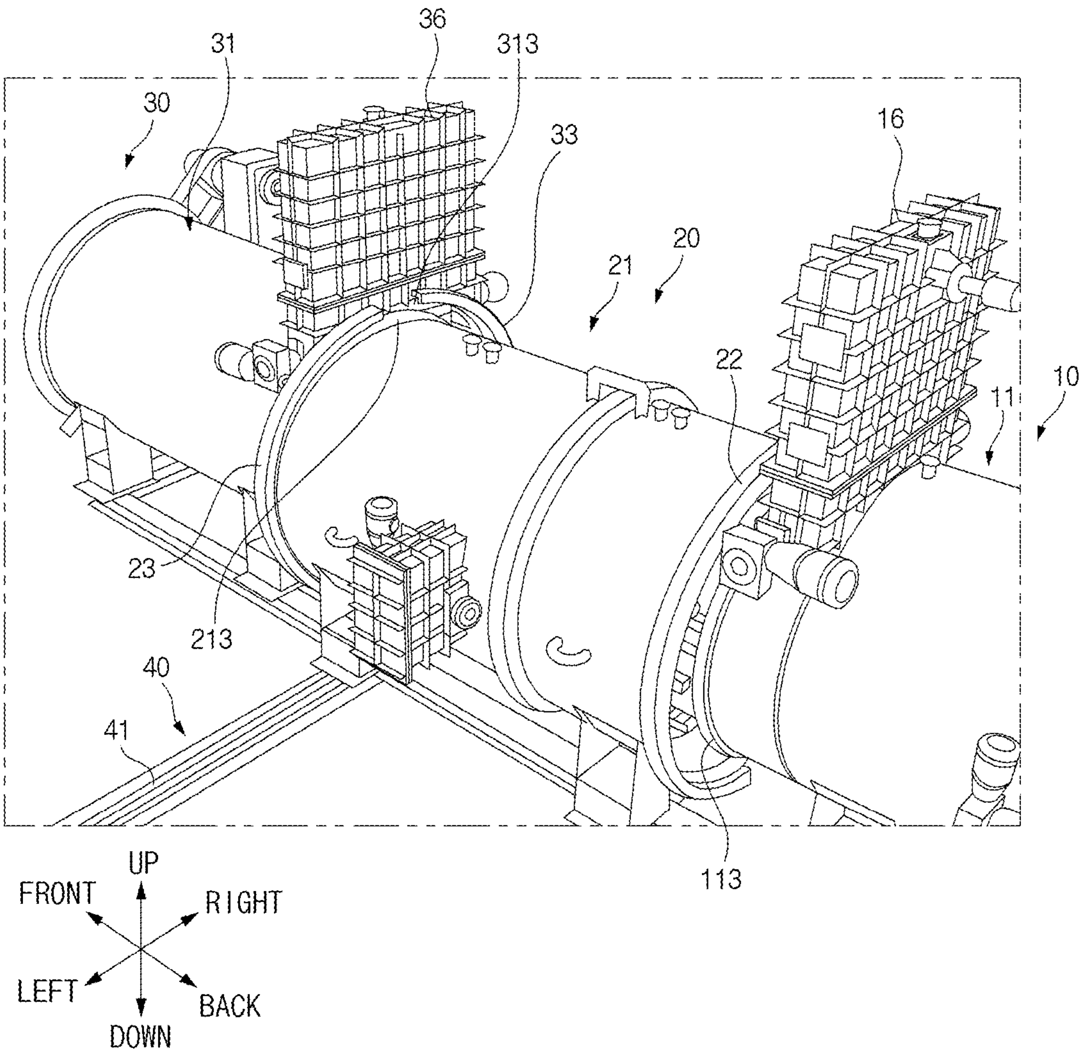

【Figure 9】
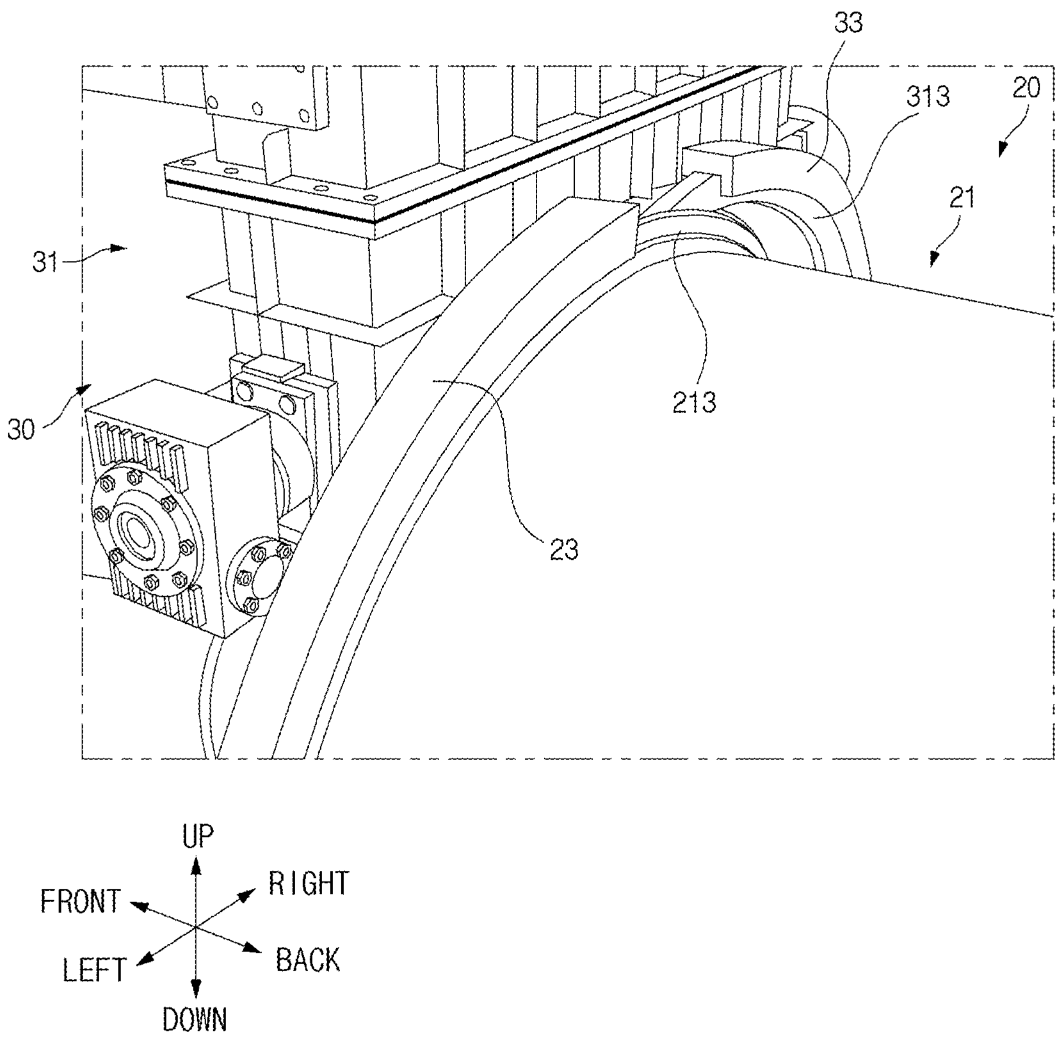

【Figure 10】
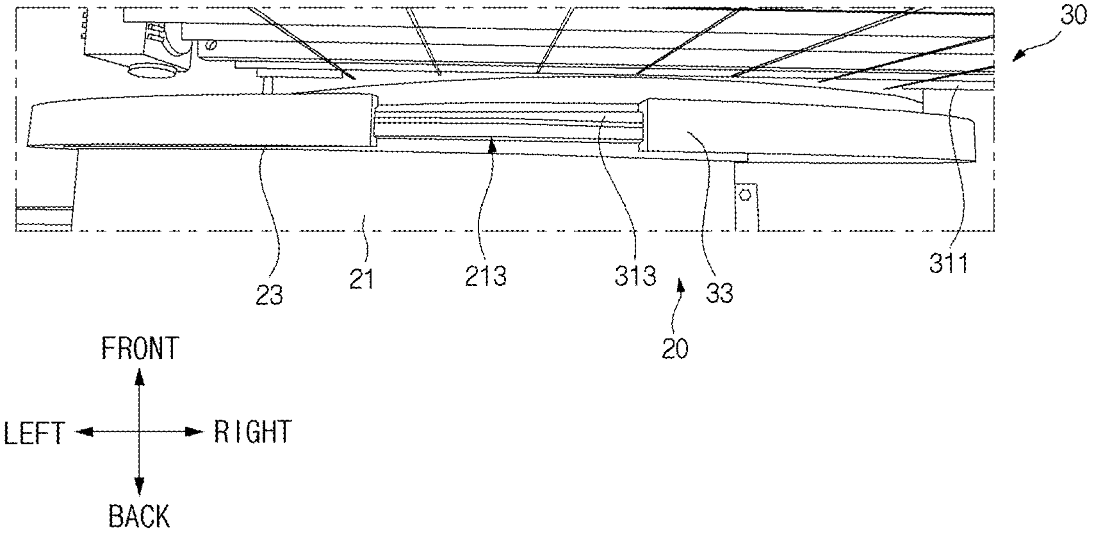

【Figure 11】
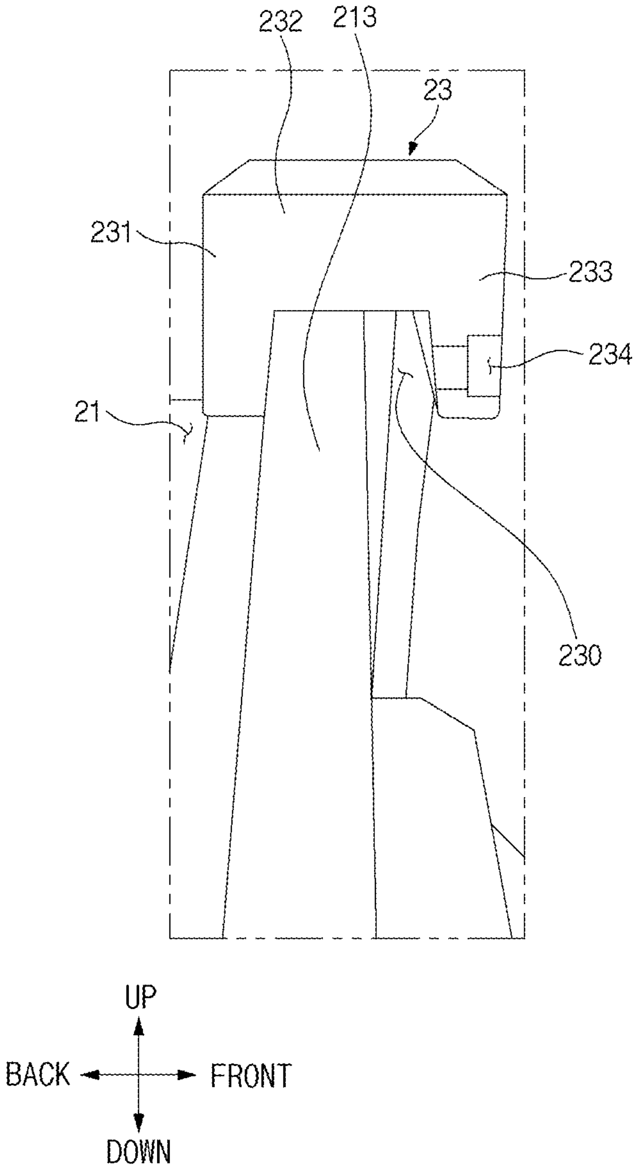

【Figure 12】
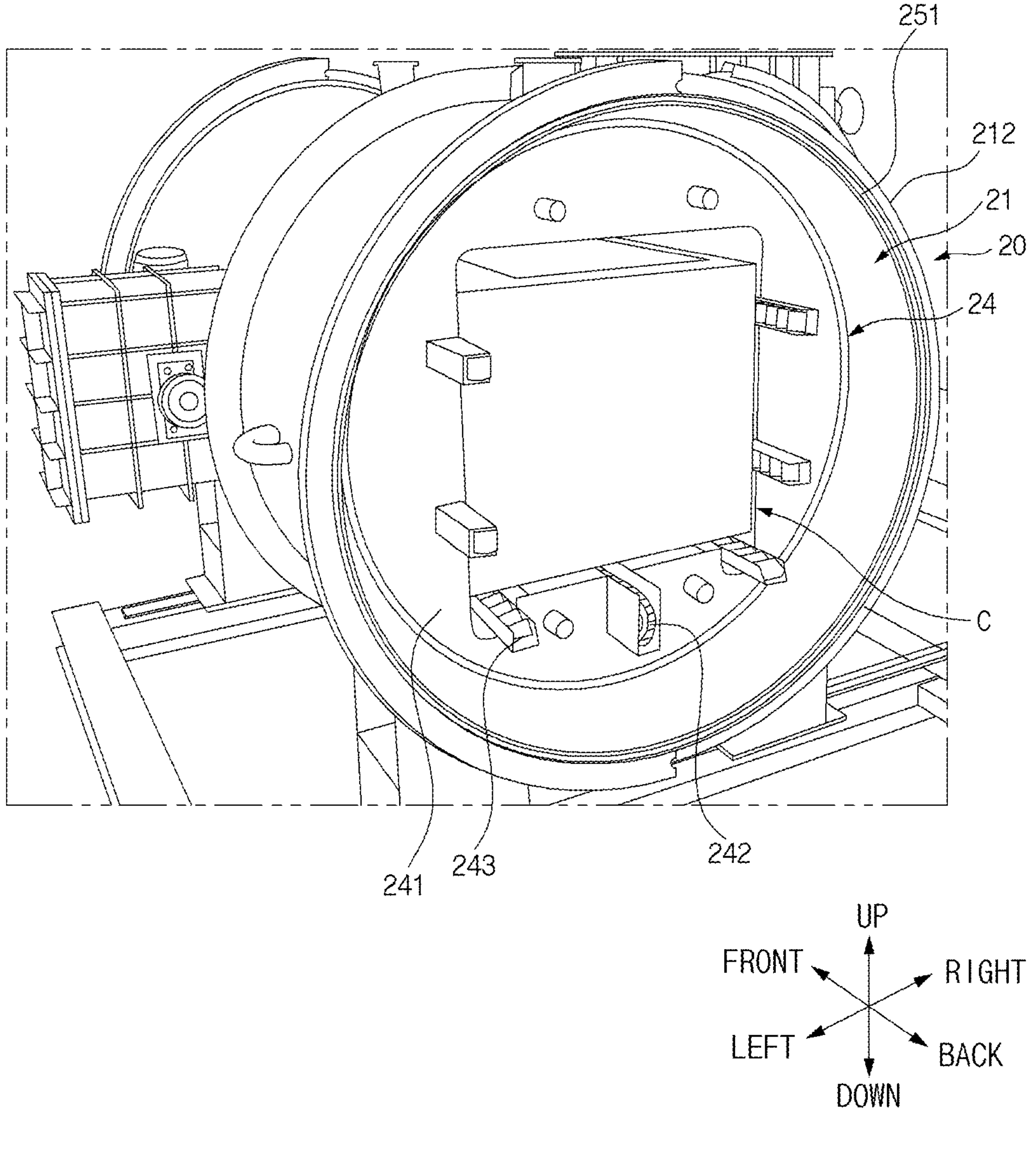

【Figure 13】
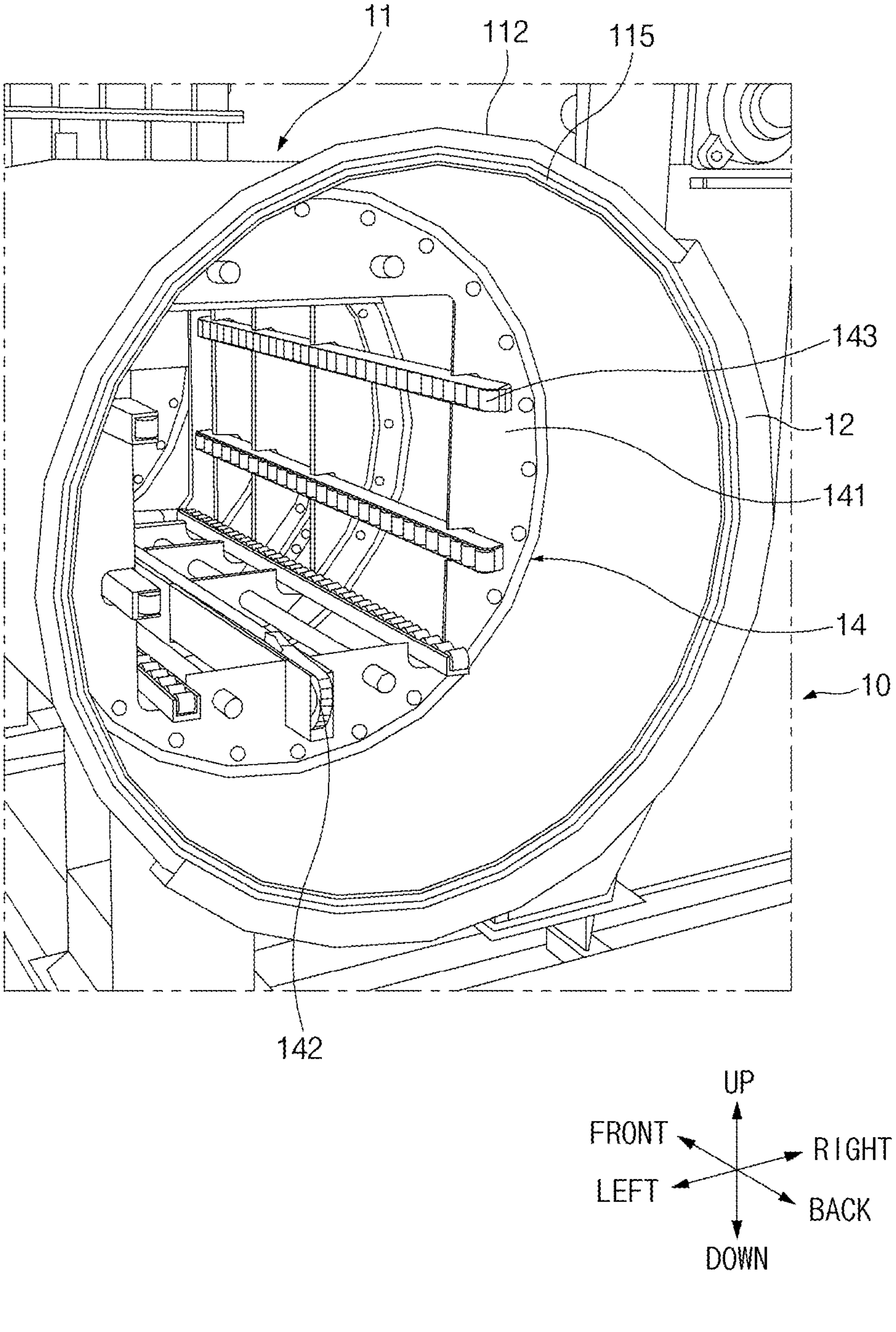

【Figure 14】
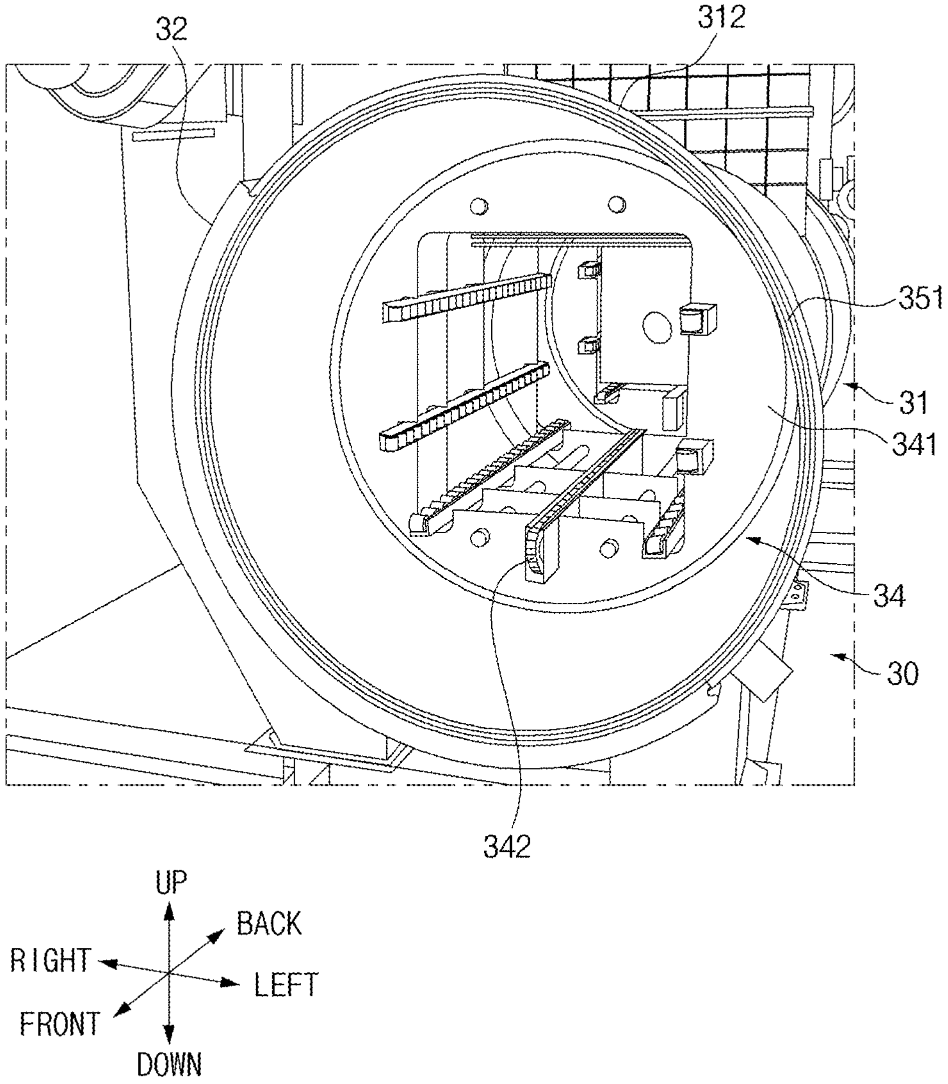

【Figure 15】
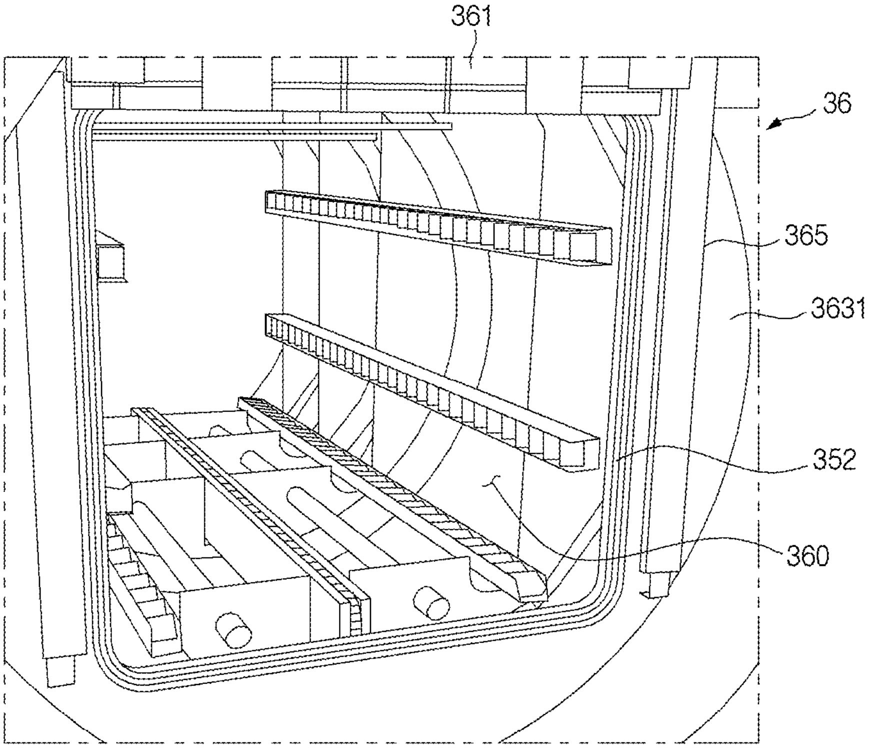

【Figure 16】
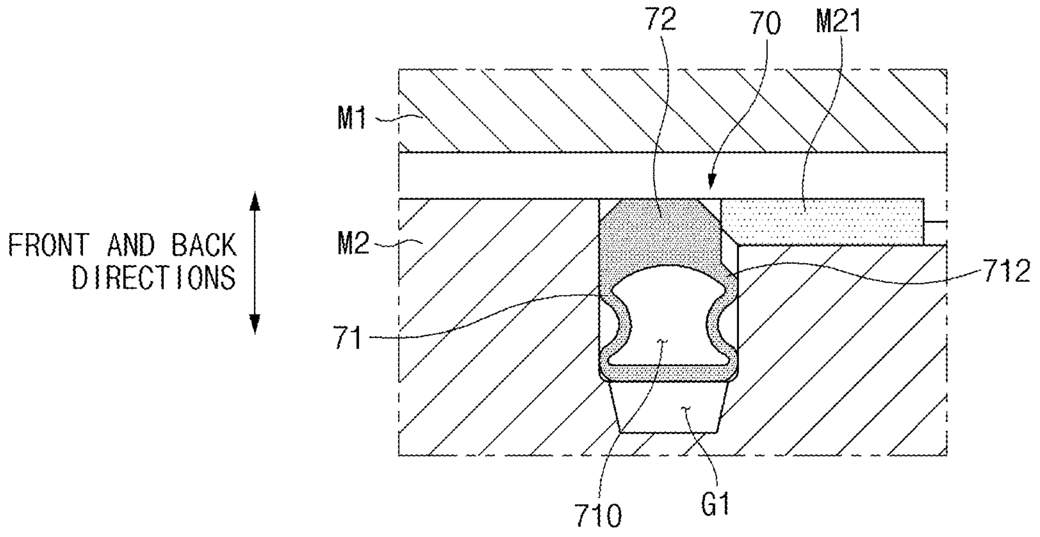

【Figure 17】
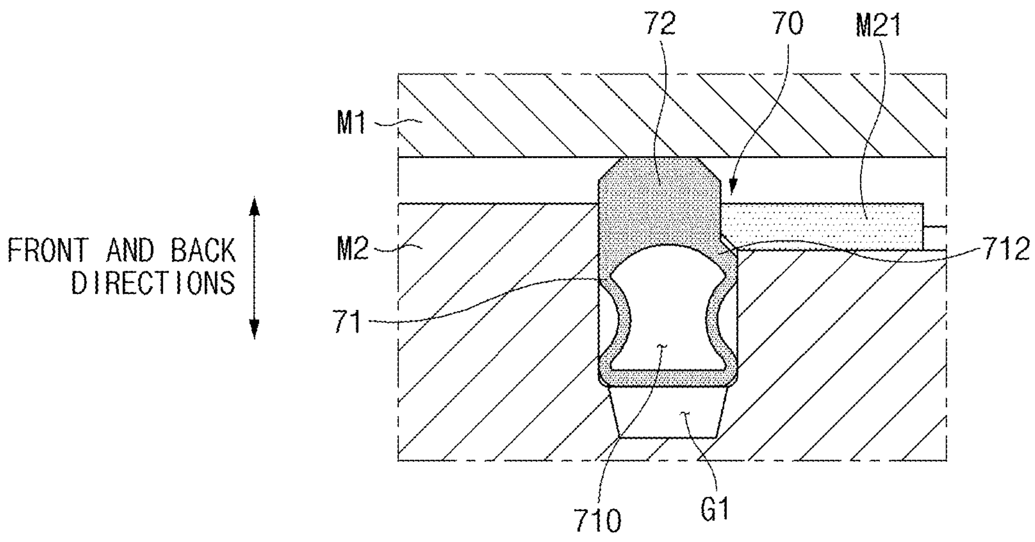

【Figure 18】
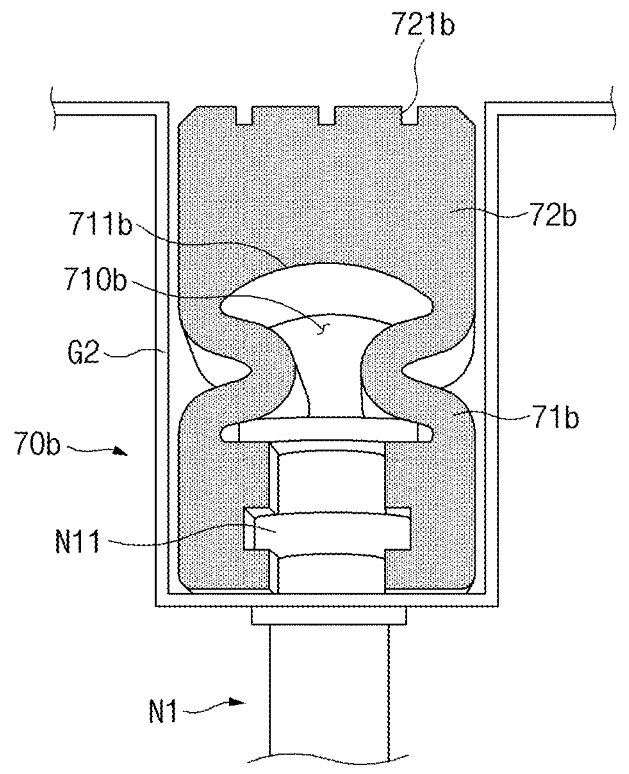

【Figure 19】
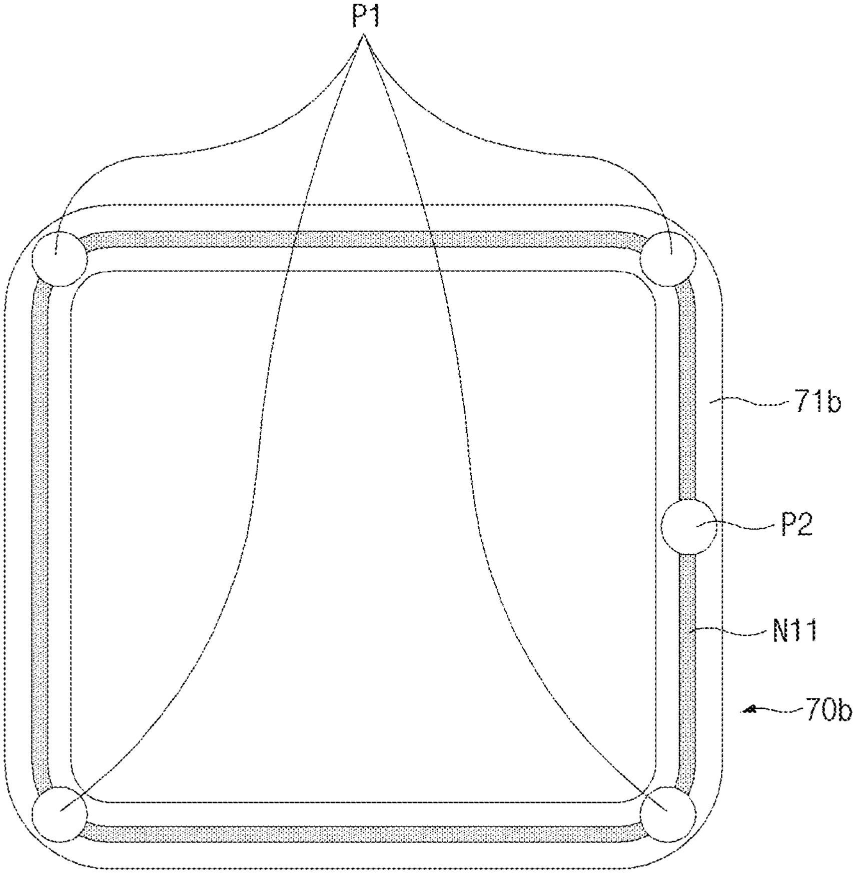

【Figure 20】
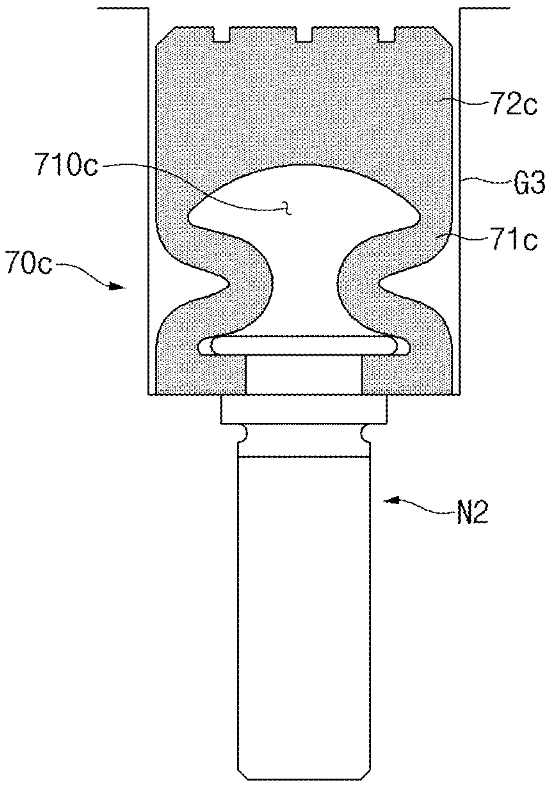

【Figure 21】
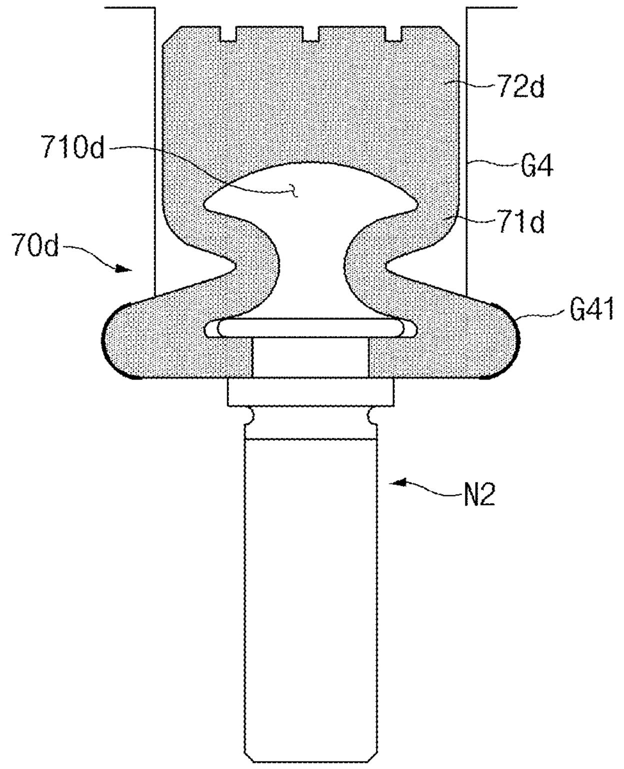

【Figure 22】
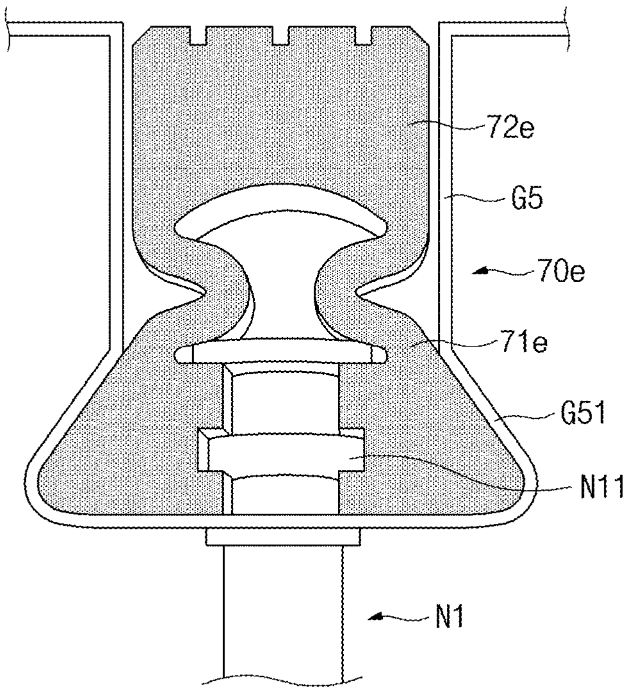

【Figure 23】
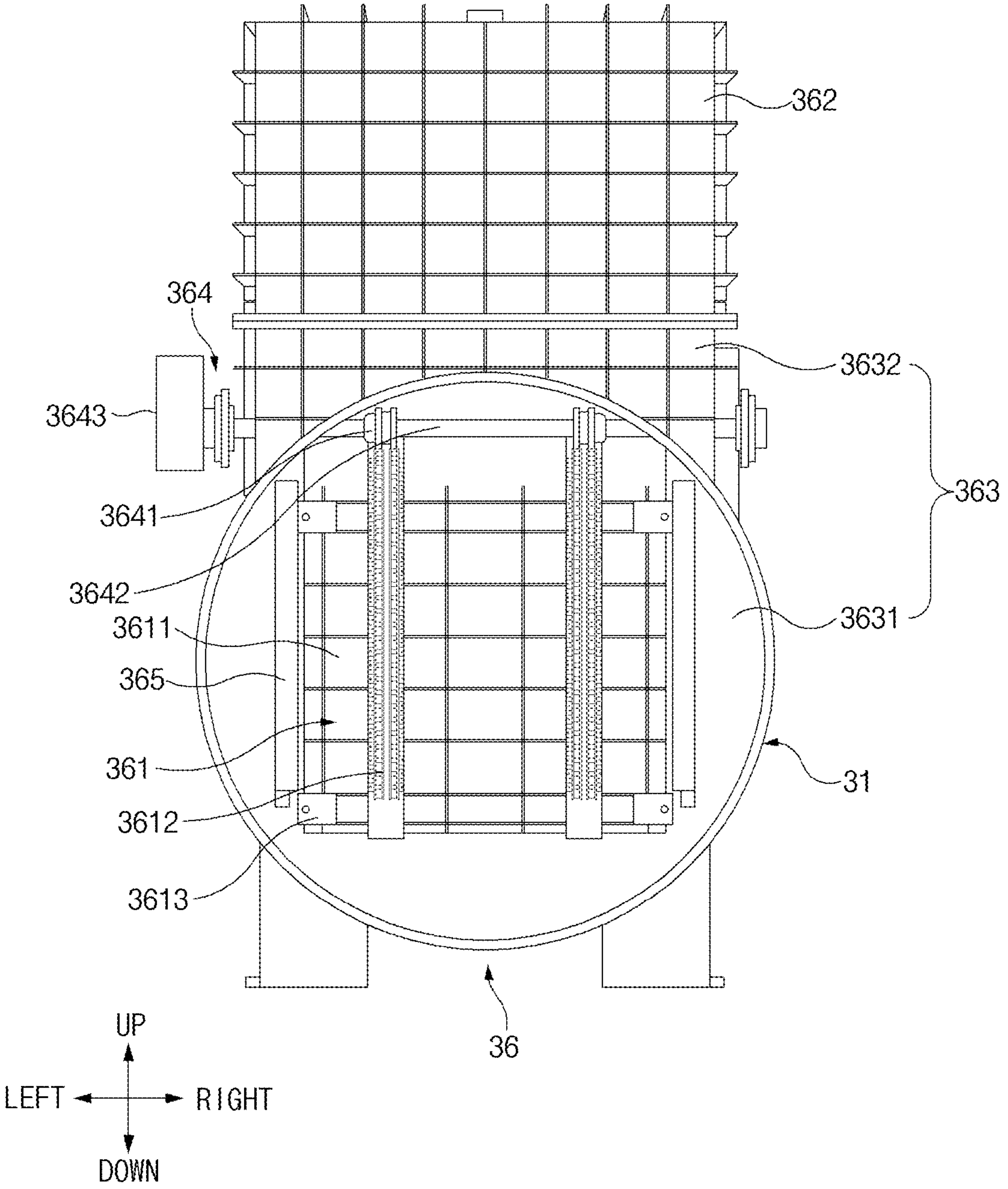

【Figure 24】
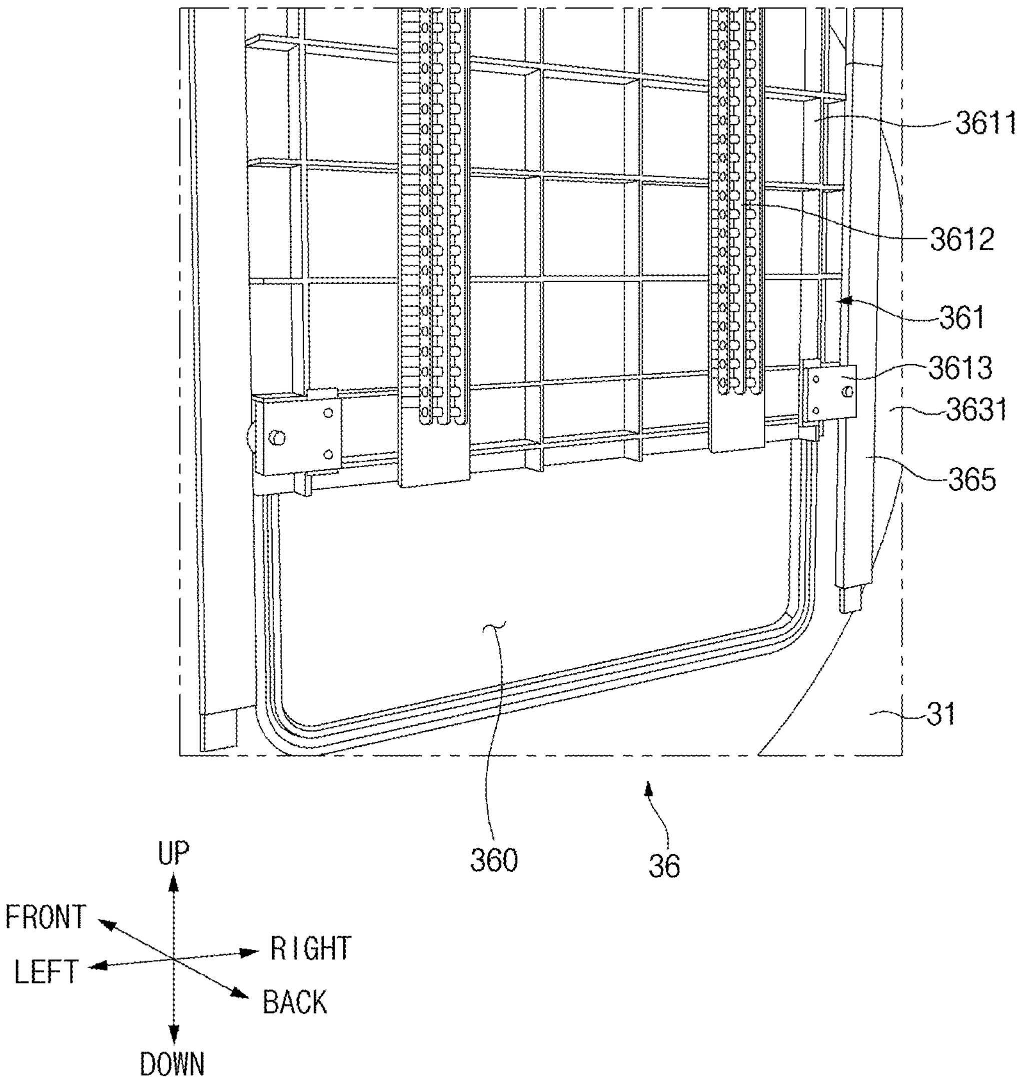

【Figure 25】
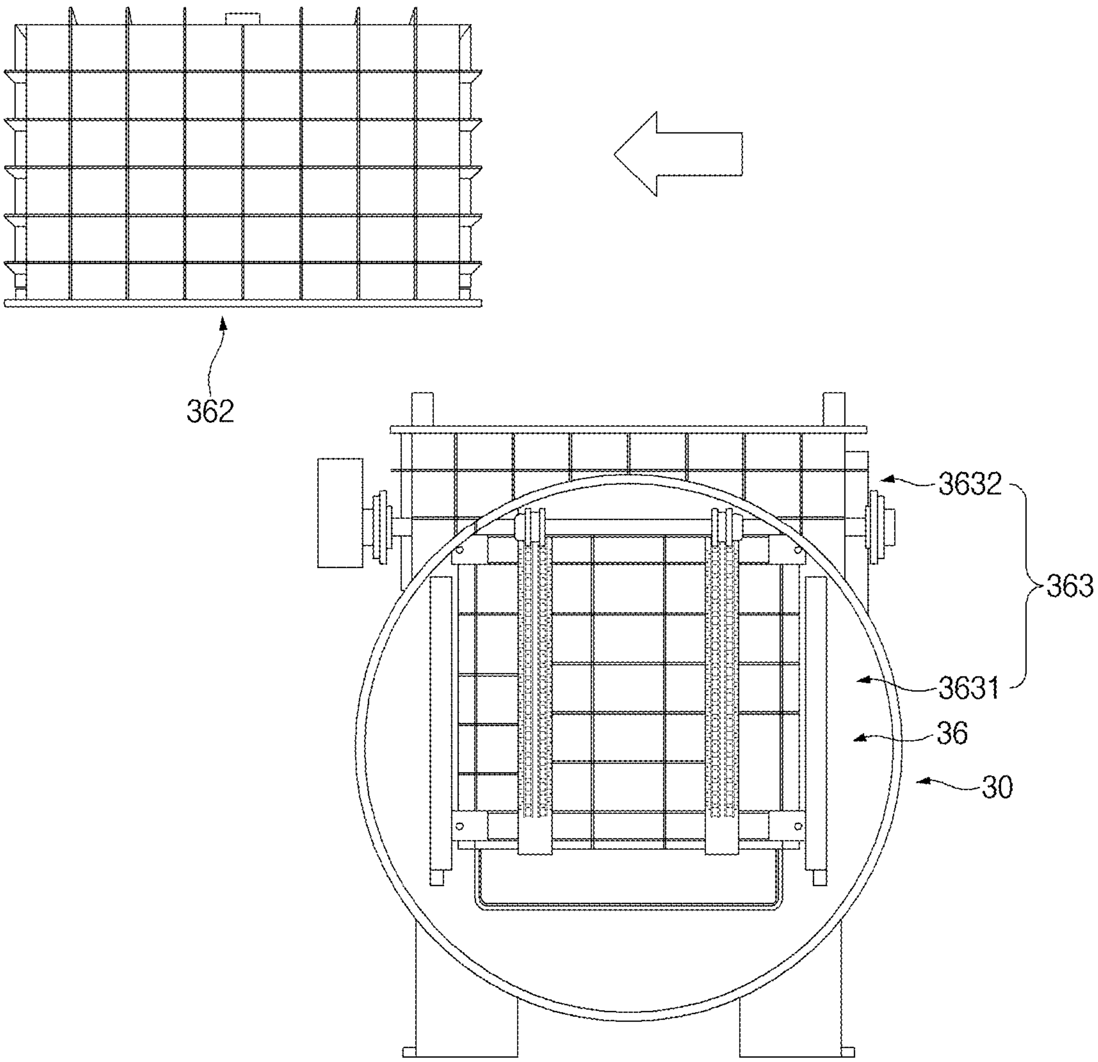

【Figure 26】
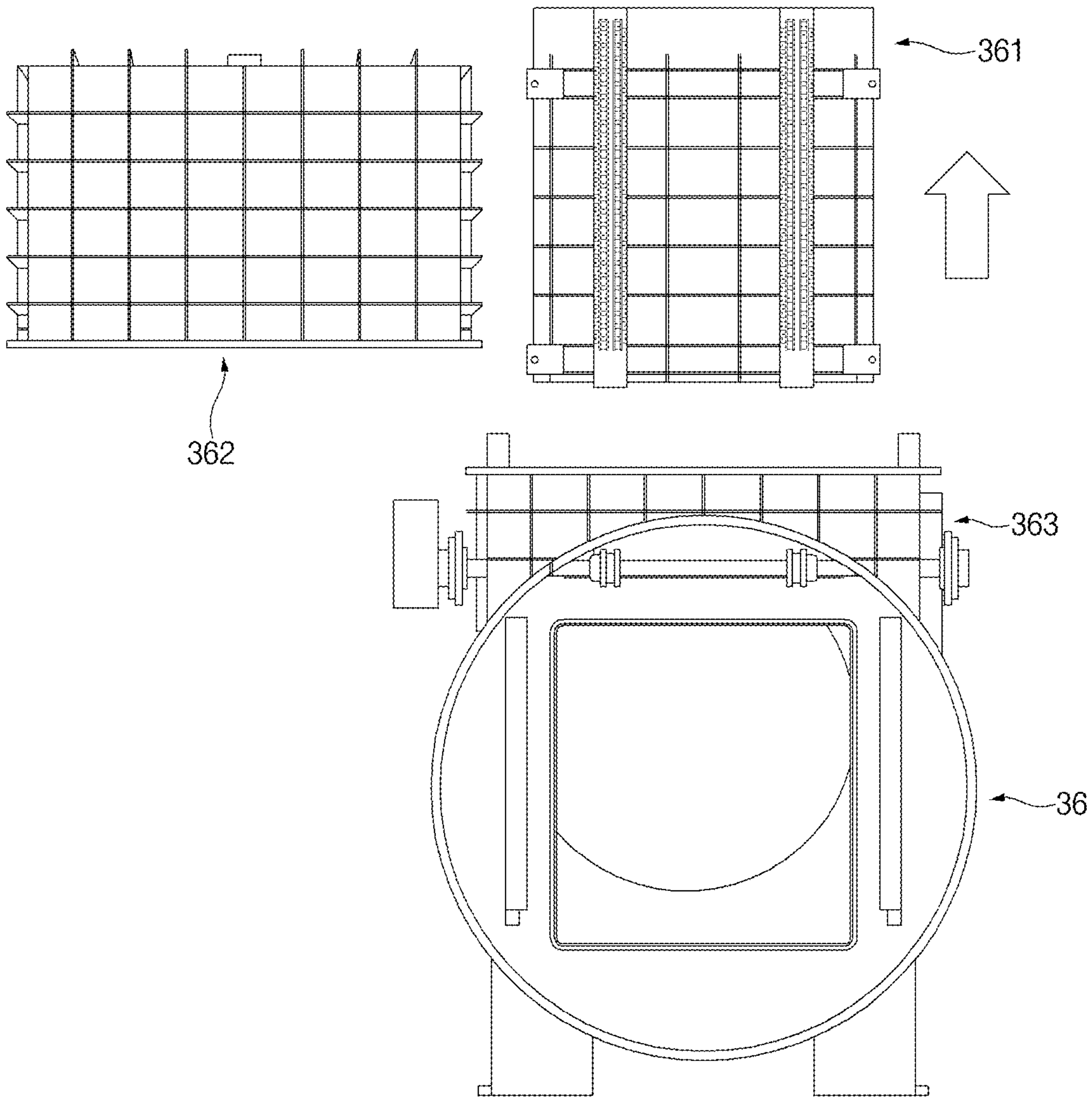

【Figure 27】
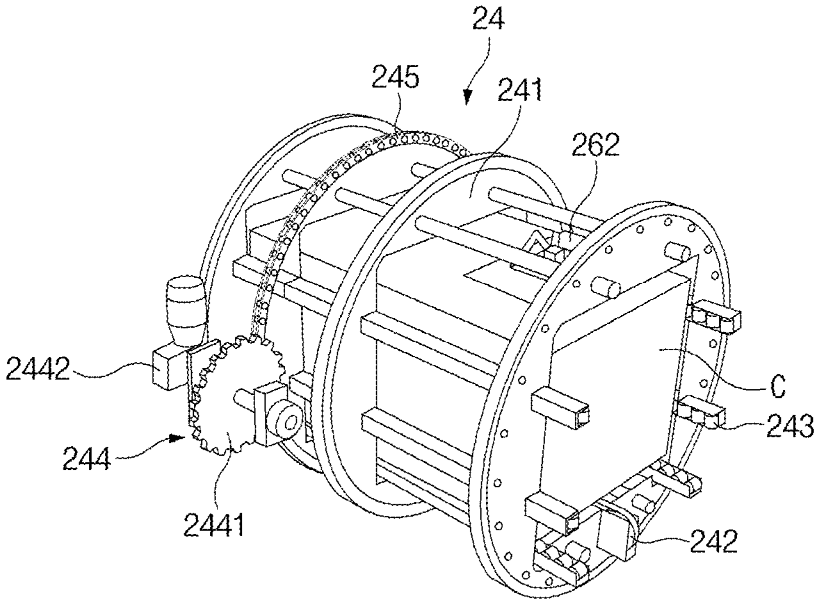
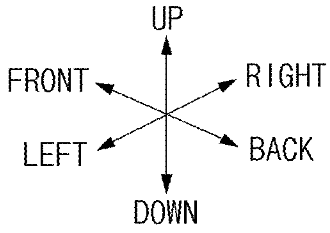

【Figure 28】
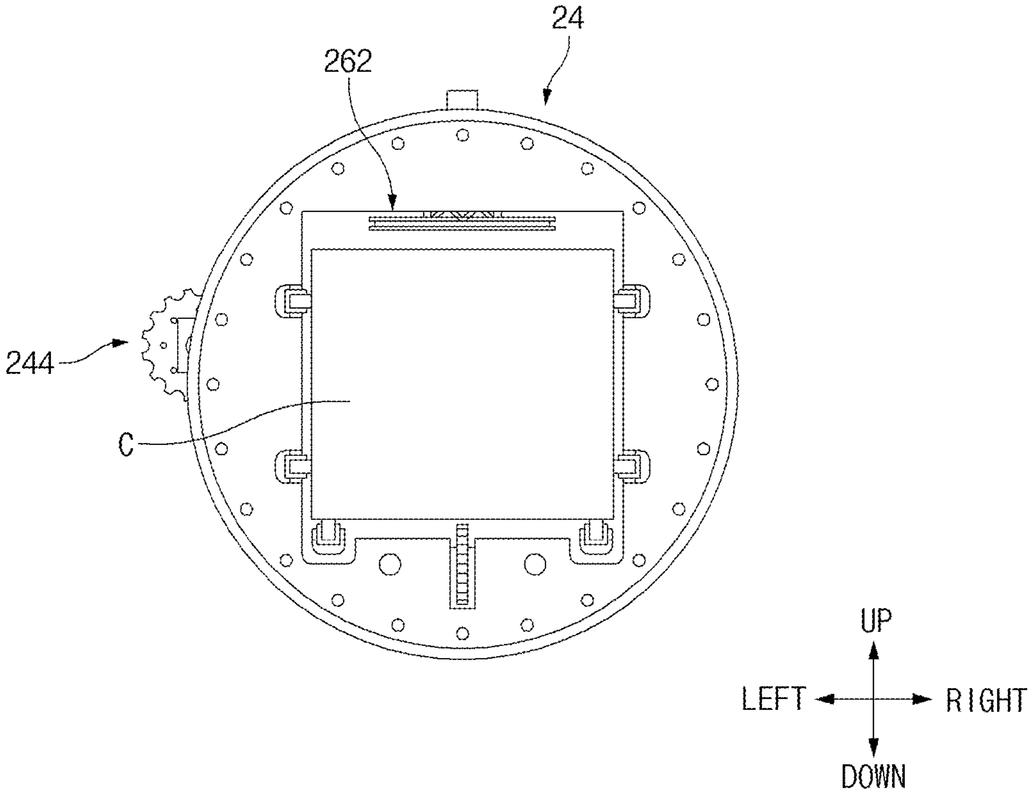

【Figure 29】
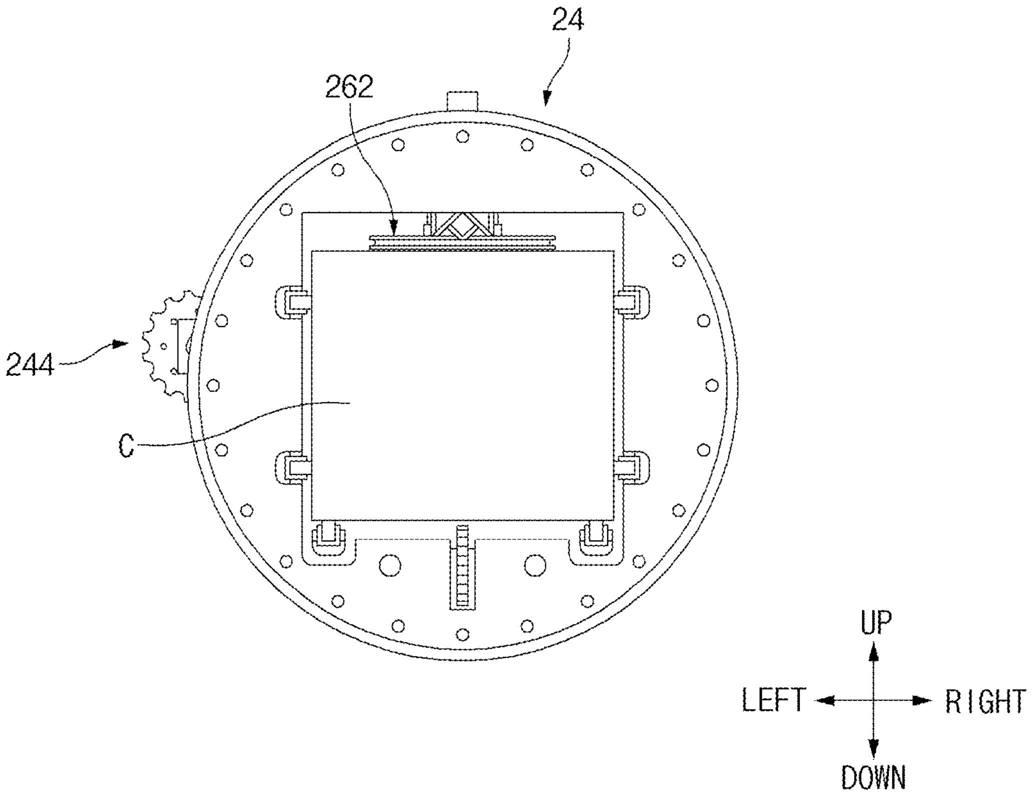

【Figure 30】
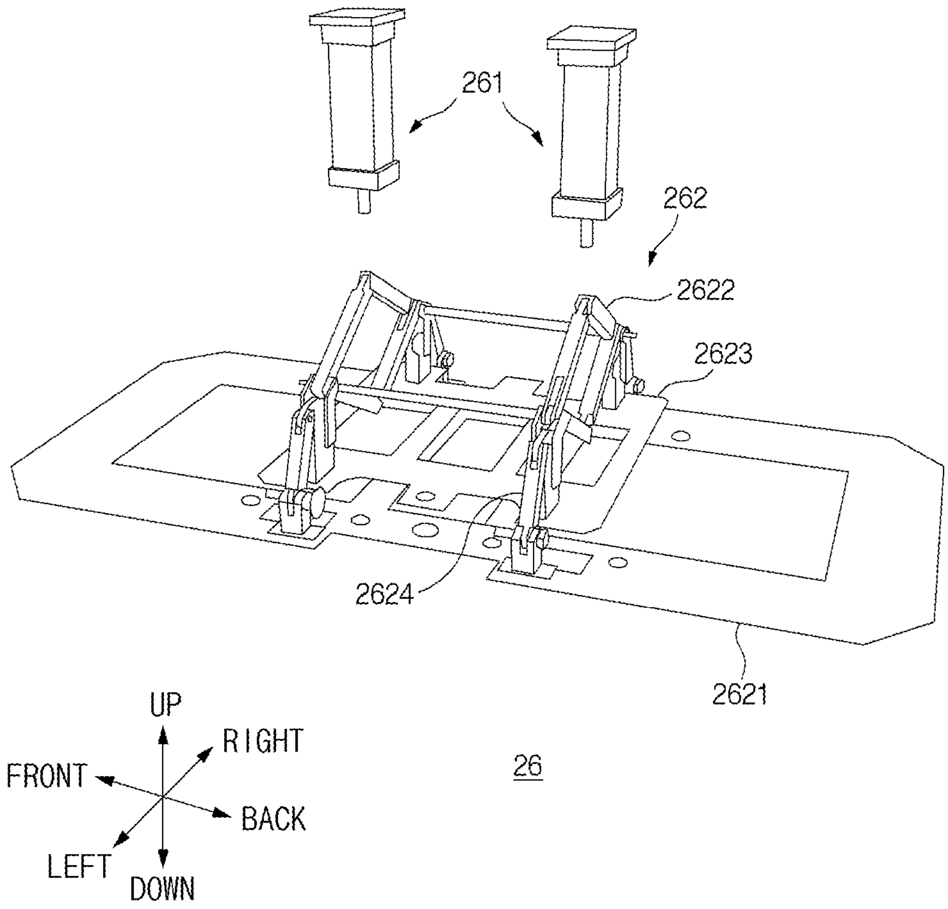

【Figure 31】
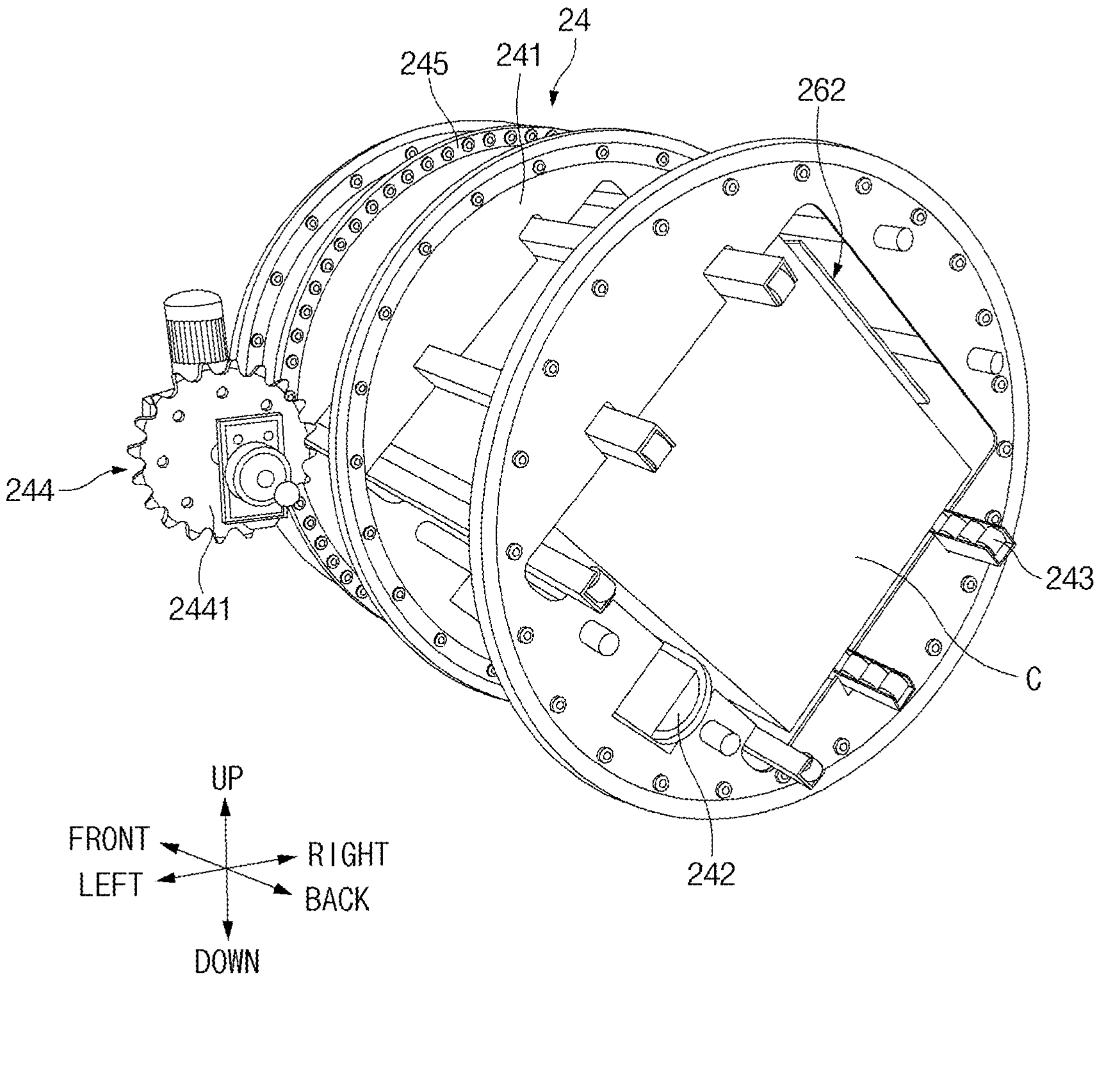

【Figure 32】
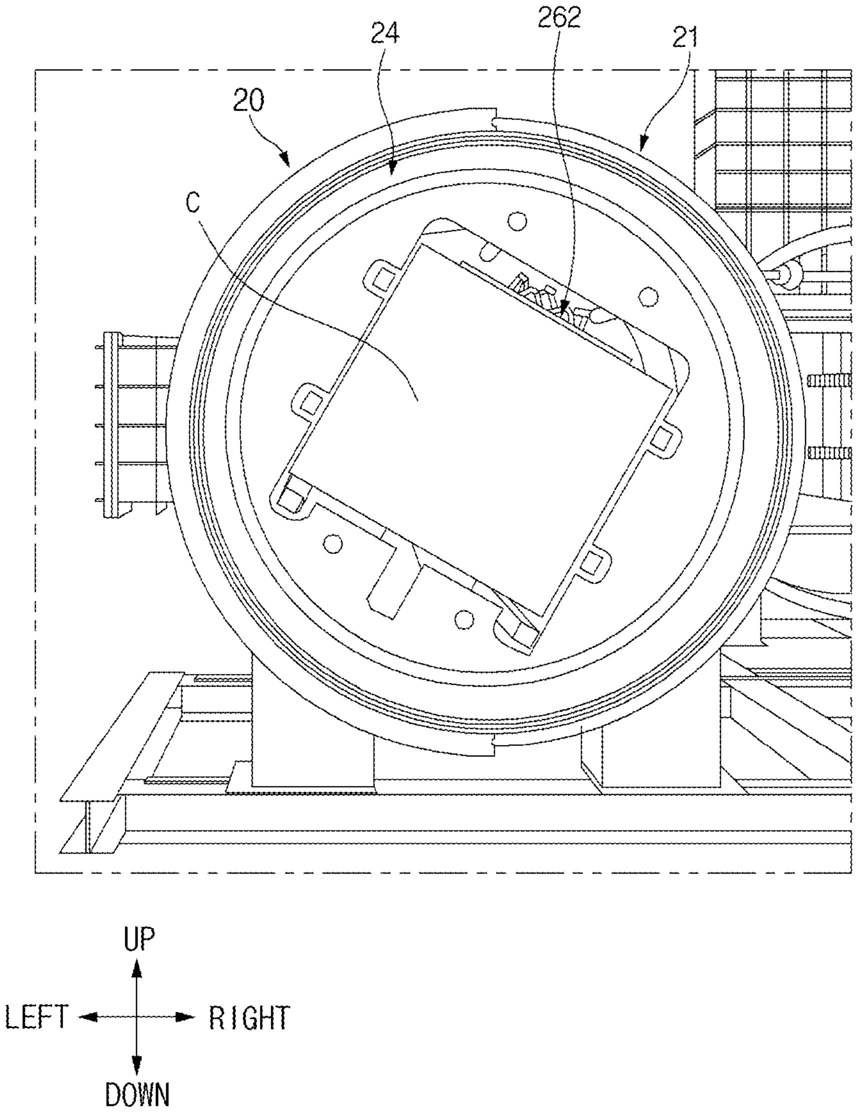

【Figure 33】
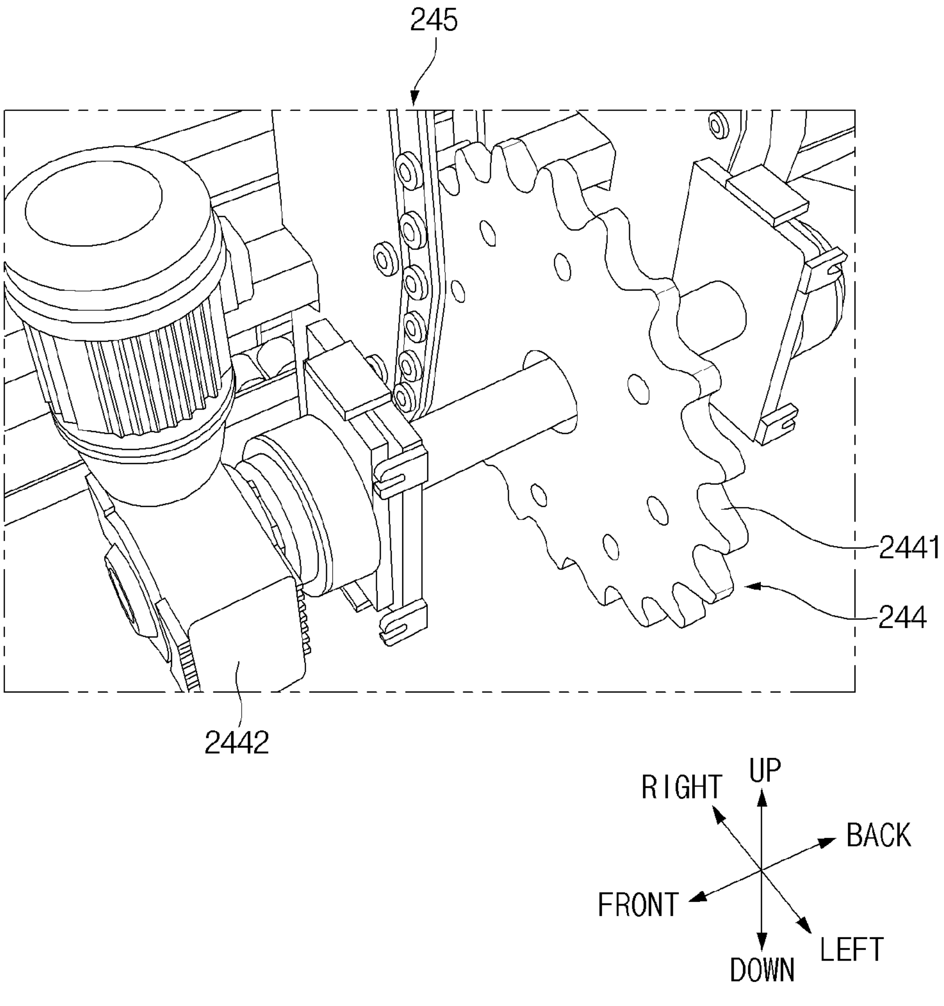

CART TREATMENT SYSTEM

TECHNICAL FIELD

The present invention relates to cart treatment, and more particularly, to a system for treating products loaded on a cart by sterilization or the like.

BACKGROUND ART

Retort food refers to food formed by applying high temperature heat to a sealed food product to sterilize the food and then rapidly cooling the food. A retort sterilizer is a device that applies high temperature heat to a sealed product during a manufacturing process of the retort food.

Various methods have been applied to increase product production efficiency by treating multiple products for a short period of time while sterilizing products uniformly and well.

A batch method may be used in which products are loaded onto a cart and enter a sterilizer to be sterilized at once to perform all treatment processes. In this case, there was a problem that additional heat treatment time is required due to low thermal efficiency, and uniform heating is not achieved due to deviation in heat distribution.

A continuous method for treating each product one by one in a separate space while continuously transferring products may be used. In this case, there was a problem that a length of the entire device is excessively long, and a complex structure makes it difficult for workers to enter and makes maintenance and repair difficult.

In addition, there have been systems that have emerged to compensate for shortcomings of the continuous and batch methods, but for safety, the entire sterilization system needs to be designed in accordance with a pressure vessel. In particular, in some countries, the entire sterilization system is treated like a pressure vessel, and can be distributed only if it meets design conditions equivalent to a pressure vessel. Therefore, even if the shortcomings of the continuous and batch methods are compensated for, there was a problem that the system should be modified within a structure that can sufficiently maintain airtightness between each component to satisfy the design conditions equivalent to a pressure vessel.

DISCLOSURE OF THE INVENTION

Technical Problem

The present invention was devised to solve these problems and provides a cart treatment system with easy maintenance and airtightness maintenance.

Technical Solution

According to an embodiment of the present invention, a cart treatment system includes: a pre-treatment module for cart treatment; an intermediate module provided to receive and treat the cart which is treated in the pre-treatment module; and a post-treatment module provided to receive and treat the cart which is treated in the intermediate module, wherein the intermediate module is provided to be put in either a coupled state in which the pre-treatment module is coupled to the post-treatment module or a detached state in which the pre-treatment module is detached from the post-treatment module.

Advantageous Effects

Accordingly, it is possible to uniformly heating loaded products quickly while using a cart method.

By allowing a module to be separated, it is possible to facilitate maintenance and repair of a sterilizer, and separate and replace or repair a module when major repairs are necessary.

Even if an equipment failure occurs in a specific module and an abnormality occurs in products, since a problem occurs only in the corresponding module and products located in the corresponding module, it is possible to minimize the amount of waste.

Even if the module has a separate structure, it is possible to easily maintain airtightness between each module through each coupling part.

BRIEF DESCRIPTION OF THE DRAWINGS

FIG. 1 is a perspective view of a cart treatment system according to an embodiment of the present invention.

FIG. 2 is a diagram illustrating the cart treatment system according to the embodiment of the present invention viewed in left and right directions.

FIG. 3 is a diagram illustrating the cart treatment system according to the embodiment of the present invention viewed downward from top.

FIG. 4 is a perspective view illustrating a state in which an intermediate module of the cart treatment system according to the embodiment of the present invention is separated from a pre-treatment module and a post-treatment module.

FIG. 5 is a diagram illustrating the state of FIG. 4 viewed downward from top.

FIG. 6 is a diagram illustrating a situation in which a shutter is closed in the state of FIG. 4.

FIG. 7 is a perspective view illustrating a state in which a pre-treatment door of the cart treatment system according to the embodiment of the present invention is in an opened state.

FIG. 8 is a perspective view illustrating a situation in which the intermediate module of the cart treatment system according to the embodiment of the present invention approaches the pre-treatment module and the post-treatment module.

FIG. 9 is a detailed enlarged view of a part of FIG. 8.

FIG. 10 is a diagram illustrating a part of FIG. 8 viewed downward from top.

FIG. 11 is a diagram illustrating an area adjacent to a front end coupling part of the cart treatment system according to the embodiment of the present invention.

FIG. 12 is a diagram illustrating an arrangement of a pre-treatment seal in the intermediate module of the cart treatment system according to the embodiment of the present invention.

FIG. 13 is a diagram illustrating an arrangement of an inlet seal in the pretreatment module of the cart treatment system according to the embodiment of the present invention.

FIG. 14 is a diagram illustrating an arrangement of an outlet seal in the post-treatment module of the cart treatment system according to the embodiment of the present invention.

FIG. 15 is a diagram illustrating an arrangement of a post-treatment shutter seal arranged in a post-treatment shutter of the cart treatment system according to the embodiment of the present invention.

FIG. 16 is a cross-sectional view illustrating a state in which packing of the cart treatment system according to the embodiment of the present invention contracts.

FIG. 17 is a cross-sectional view illustrating a state in which the packing of the cart treatment system according to the embodiment of the present invention expands.

FIG. 18 is a diagram illustrating a cross section of a packing and a structure of a nipple according to a first modification of the embodiment of the present invention.

FIG. 19 is a diagram illustrating an arrangement of a nipple installation location and a nipple fixing part in the packing according to the first modification of the embodiment of the present invention.

FIG. 20 is a diagram illustrating a cross section of a packing and a structure of a nipple according to a second modification of the embodiment of the present invention.

FIG. 21 is a diagram illustrating a cross section of a packing and a structure of a nipple according to a third modification of the embodiment of the present invention.

FIG. 22 is a diagram illustrating a cross section of a packing and a structure of a nipple according to a fourth modification of the embodiment of the present invention.

FIG. 23 is a diagram illustrating a state in which the post-treatment shutter of the cart treatment system according to the embodiment of the present invention is closed, viewed from the front.

FIG. 24 is a diagram illustrating a state in which the post-treatment shutter according to the embodiment of the present invention is partially opened.

FIG. 25 is a diagram illustrating a state in which a post-treatment shutter upper housing is separated from a post-treatment shutter lower housing according to an embodiment of the present invention.

FIG. 26 is a diagram illustrating a state in which a post-treatment shutter covering part is discharged to the outside in the state of FIG. 25.

FIG. 27 is a perspective view illustrating a state of a rotation means and a cart before the cart is fixed by a fixing means according to an embodiment of the present invention.

FIG. 28 is a diagram illustrating the state of FIG. 27 viewed from the front.

FIG. 29 is a perspective view illustrating a state in which the cart is fixed by the fixing means according to the embodiment of the present invention.

FIG. 30 is a perspective view of the fixing means of the cart treatment system according to the embodiment of the present invention.

FIG. 31 is a perspective view illustrating a situation in which the cart rotates while the cart is fixed by the fixing means according to the embodiment of the present invention.

FIG. 32 is a diagram illustrating the state of FIG. 31 viewed from the front.

FIG. 33 is a diagram illustrating a rotation driving unit of the cart treatment system according to the embodiment of the present invention.

MODE FOR CARRYING OUT THE INVENTION

This application claims priority based on Korean Patent Application No. 10-2021-0109762 filed on Aug. 19, 2021, and all contents disclosed in the specification and drawings of the application are incorporated in this application.

Hereinafter, some embodiments of the present disclosure will be described in detail with reference to the accompanying drawings. It is to be noted that in giving reference numerals to components of each of the accompanying drawings, the same components will be denoted by the same reference numerals even if they are shown in different drawings. Further, in describing the embodiments of the present invention, well-known constructions or functions will not be described in detail in the case in which it is decided that they may unnecessarily obscure the understanding of exemplary embodiments of the present invention.

In addition, the terms 'first', 'second', A, B, (a), (b), and the like, will be used in describing components of embodiments of the present disclosure. These terms are used only in order to distinguish any component from other components, and features, sequences, or the like, of corresponding components are not limited by these terms. When it is mentioned that any component is "connected" or "coupled" to another component, it is to be understood that any component is directly connected or coupled to another component or is connected or coupled to another component with the other component interposed therebetween.

FIG. 1 is a perspective view of a cart treatment system 1 according to an embodiment of the present invention. FIG. 2 is a diagram illustrating the cart treatment system 1 according to the embodiment of the present invention viewed in left and right directions. FIG. 3 is a diagram illustrating the cart treatment system 1 according to the embodiment of the present invention viewed downward from top.

Referring to the drawings, the cart treatment system 1 according to an embodiment of the present invention includes a pre-treatment module 10, an intermediate module 20, and a post-treatment module 30. The intermediate module 20 is provided to receive and treat a cart C which is treated in the pre-treatment module 10. The post-treatment module 30 is provided to receive and treat the cart C which is treated by the intermediate module 20. Each module is a module that applies treatment such as heat treatment to products loaded in the cart C, and therefore, may be referred to as a cart treatment module. That is, the pre-treatment module 10, the intermediate module 20, and the post-treatment module 30 may be referred to as the cart treatment module. However, the treatment that each cart treatment module applies to the cart C and products loaded in the cart C may not be limited to the heat treatment.

The modules comprising the cart treatment system 1 of the present invention may be arranged along front and back directions. The pre-treatment module 10, the intermediate module 20, and the post-treatment module 30 may be arranged in order going forward. The cart C may proceed along the front within the cart treatment system 1. The cart C treated in the pre-treatment module 10 moves forward and is transferred to the intermediate module 20 for treatment, and the cart C treated in the intermediate module 20 may move forward and may be transferred to the post-treatment module 30 and treated.

In this specification, the left and right directions and up and down directions refer to directions perpendicular to the front and back directions. Each direction is used for convenience of description, and may be relative depending on a direction and posture in which the cart treatment system 1 is arranged.

The pre-treatment module 10 may include a pre-treatment body 11. The intermediate module 20 may include an intermediate body 21. The post-treatment module 30 may include a post-treatment body 31. The pre-treatment body 11 may be defined by surrounding a pre-treatment space, which is an internal space provided for the cart C to pass through and be treated. The intermediate body 21 may be defined by surrounding an intermediate space, which is the internal space provided for the cart C to pass through and be treated. The pre-treatment body 31 may be defined by surrounding a post-treatment space, which is the internal space provided for the cart C to pass through and be treated. Therefore, the pre-treatment body 11, the intermediate body 21, and the post-treatment body 31 may physically separate the space located therein from an external space. Since each module may be referred to as the cart treatment module, the pre-treatment body 11, the intermediate body 21, and the post-treatment body 31 may be referred to as a treatment body. The treatment body may be formed in an opened cylindrical shape along the front and back directions, but its shape is not limited thereto.

The intermediate module 20 may include a protruding body 217 protruding from a cylindrical part of the intermediate body 21. The protruding body 217 may accommodate a part that provides driving force for a rotating means 24.

The treatment body may include a hard treatment body divided into a plurality of parts and a soft treatment body made of an expandable or flexible material and connecting the divided parts of the hard treatment body to form an expansion joint. Each part of the hard treatment body may be divided from each other along the front and back directions, and the soft body can connect the hard body 211 of each part in the front and back directions.

The treatment body including the soft treatment body may expand or contract in the front and back directions depending on an external force applied to the treatment body due to a pressure difference or the like. Upon the contraction, the soft-treated body may have a wrinkled shape. In an embodiment of the present invention, it is described that the intermediate body 21 is divided into two parts of the medium hard treatment body 211, which is a type of hard treatment body, and the medium soft treatment body 214, which is a type of soft treatment body, and can expand or contract, but this configuration is not limited to the intermediate body 21. The treatment body becomes flexible, allowing the treatment body to accommodate a change in pressure. As the treatment body accepts the change in pressure, when the change in pressure occurs while bodies 11, 21, and 31 of each module 10, 20, and 30 are coupled to each other by coupling parts 13, 22, 23, and 33, damage to the coupling parts 13, 22, 23, and 33 due to pressure changes may be prevented.

The treatment body may further have a bridge 215 that connects the plurality of parts of the hard treatment body to prevent the divided parts of the hard treatment body from being excessively deformed, such as twisting each other, by the soft treatment body.

The cart treatment module may include a heat medium providing device formed toward the internal space for the heat treatment of the cart C. The heat medium may be steam, hot water, a refrigerant, etc., and the heat medium providing device may include a pump and a nozzle to pump the heat medium. The cart treatment module may further include other medium providing devices that spray disinfectants for other treatments such as disinfection or provide detergent or washing water for internal cleaning in the form of spray.

FIG. 4 is a perspective view illustrating the state in which the intermediate module 20 of the cart treatment system 1 according to the embodiment of the present invention is separated from the pre-treatment module 10 and the post-treatment module 30. FIG. 5 is a diagram illustrating the state of FIG. 4 viewed downward from top. FIG. 6 is a diagram illustrating a situation in which shutters 16 and 36 are closed in the state of FIG. 4.

Each module may be detached from or coupled to each other. The intermediate module 20 may be arranged to be put in either a coupled state in which the pre-treatment module 10 is coupled to the post-treatment module 30 or a detached state in which the pre-treatment module 10 is detached from the post-treatment module 30. When the intermediate module 20 transitions from the coupled state to the detached state, it may be detached from the pre-treatment module 10 and the post-treatment module 30 along the directions crossing the front and back directions. Conversely, when the intermediate module 20 transitions from the detached state to the coupled state, it may approach the pre-treatment module 10 and the post-treatment module 30 along the directions crossing the front and back directions. In an embodiment of the present invention, it is described that the direction in which the intermediate module 20 is detached from the pre-treatment module 10 and the post-treatment module 30 while going toward the detached state is a left direction and the direction in which the intermediate module 20 moves while going toward the coupled state is a right direction, but the direction is not limited thereto.

The cart treatment system 1 according to an embodiment of the present invention may include a module movement device 40. The module movement device 40 is coupled to the intermediate module 20 to move the intermediate module 20 so that the intermediate module 20 is put in either the coupled state or the detached state. The module movement device 40 may include a moving rail 41 to which the intermediate module 20 is slidably coupled. The moving rail 41 may extend along the left and right directions and be arranged on the ground. The intermediate module 20 may include an intermediate leg 27 that extends downward from the intermediate body 21 and an intermediate roller coupled to a lower end of the intermediate leg 27 so that it may slide along the moving rail 41, and the intermediate roller may be slidably coupled to the moving rail 41. The module movement device 40 may include a fixed rail 42 that is coupled to other modules and extends along the front and back directions so that other modules may be arranged in a predetermined position. The moving rail 41 may be arranged across the fixed rail 42.

The pre-treatment module 10 has a pre-treatment leg 17 extending downward from the pre-treatment body 11, and the post-treatment module 30 has a post-treatment leg 37 extending downward from the post-treatment body 31 and may support the pre-treatment module 10 and the post-treatment module 30, respectively, by coupling the lower ends of the pre-treatment leg 17 and the post-treatment leg 37 to the fixed rail 42 or located on the ground.

A towing hook 216 on which a winch or hoist may be hooked may be formed on an outer side surface of the intermediate body 21. The winch or hoist may be hooked on the towing hook 216 and pulled in the left and right directions so that the intermediate module 20 moves along the moving rail 41 and is detached from or coupled to the pre-treatment module 10 and the post-treatment module 30.

In addition, the module movement device 40 includes a power source and drives the intermediate roller, thereby allowing the intermediate module 20 to move left and right along the moving rail 41.

In this way, each cart treatment module can be selectively detached or coupled to form an integrated system capable of step-by-step treatment of the cart C moving along the front. In this way, it is possible to facilitate maintenance and repair of the cart treatment system 1, and when major repairs are required, it is possible to separate and replace or repair the necessary cart treatment module.

In addition, even if an equipment failure occurs in a specific cart treatment module and an abnormality occurs in products, the problem occurs only in the cart treatment module and the products located in the cart treatment module, thereby making it possible to minimize the amount of product waste.

Door

FIG. 7 is a perspective view illustrating a state in which a pre-treatment door 50 of the cart treatment system 1 according to the embodiment of the present invention is in an opened state.

A system inlet opened along the front and back directions may be formed at a rear end of the pre-treatment body 11 of the pre-treatment module 10. Through the system inlet, the cart C may move forward and enter the inside of the cart treatment system 1 from the outside. The pre-treatment module 10 may include an inlet coupling part 12 installed at the rear end of the pre-treatment body 11.

The cart treatment system 1 according to an embodiment of the present invention may include the pre-treatment door 50. The pre-treatment door 50 is a device for opening and closing the system inlet. The pre-treatment door 50 may include a pre-treatment door covering part 51. The pre-treatment door covering part 51 is a part arranged adjacent to the rear end of the pre-treatment body 11 to cover and open the system inlet. The system inlet may be formed in a circular shape, and the pre-treatment door covering part 51 may also be formed in a circular shape. When viewed along the front and back directions, an area of the pre-treatment door covering part 51 may be greater than an area of the system inlet.

The pre-treatment door 50 may include a pre-treatment door covering part 53. The pre-treatment door support part 53 is a part that is coupled to the pre-treatment door covering part 51 so as to be able to rotate axially in the front and back directions when opening and closing the system inlet. The pre-treatment door support part 53 may be coupled to the pre-treatment module 10, but it may also be fixed to the ground without being fixed to the pre-treatment module 10 or to the fixed rail 42.

The pre-treatment door 50 may include a pre-treatment door coupling part 52. The inlet coupling part 12 and the pre-treatment door coupling part 52 may be coupled to the pre-treatment door flange 54 formed around the pre-treatment door covering part 51, and when the pre-treatment door covering part 51 closes the system inlet, the pre-treatment module 10 and the pre-treatment door 50 may be coupled. The operation of the pre-treatment door coupling part 52 and the inlet coupling part 12 will be described in detail by describing the coupling relationship between the intermediate module 20, the pre-treatment module 10, and the post-treatment module 30, which will be described later.

A system outlet opened along the front and back directions may be formed at a front end of the pre-treatment body 31 of the pre-treatment module 30. Through the system outlet, the cart C may move forward and be discharged from the inside of the cart treatment system 1 to the outside. The post-treatment module 30 may include an outlet coupling part 32 installed at the front end of the post-treatment body 31.

The cart treatment system 1 according to the embodiment of the present invention may include a pre-treatment door 60. The pre-treatment door 60 is a device for opening and closing the system outlet. The post-treatment door 60 may include a post-treatment door covering part 61. The post-treatment door covering part 61 is a part arranged adjacent to the front end of the pre-treatment body 31 to cover and open the system outlet. The system outlet may be formed in a circular shape, and the post-treatment door covering part 61 may also be formed in a circular shape. When viewed along the front and back directions, an area of the post-treatment door covering part 61 may be larger than that the area of the system outlet.

The post-treatment door 60 may include a post-treatment door support part 63. The pre-treatment door support part 63 is a part that is coupled to the post-treatment door covering part 61 so as to be able to rotate axially in the front and back directions when opening and closing the system outlet. The post-treatment door support part 63 may be coupled to the post-treatment module 30, but it may also be fixed to the ground without being fixed to the post-treatment module 30 or to the fixed rail 42.

The post-treatment door 60 may include a post-treatment door coupling part 62. The outlet coupling part 32 and the post-treatment door coupling part 62 may be coupled to the post-treatment door flange 54 formed around the post-treatment door covering part 61, and when the post-treatment door covering part 61 closes the system outlet, the post-treatment module 30 and the post-treatment door 60 may be coupled. The operations of the post-treatment door coupling part 62 and the outlet coupling part 32 will be described in detail by describing the coupling relationship between the intermediate module 20, the pre-treatment module 10, and the post-treatment module 30, which will be described later.

The cart treatment system 1 may form an entirely sealed internal space by the pre-treatment door 50 and the post-treatment door 60, and this internal space may be divided from the outside by the pre-treatment door 50, the post-treatment door 60, and each module.

Coupling Part

FIG. 8 is a perspective view illustrating a situation in which the intermediate module 20 of the cart treatment system 1 according to the embodiment of the present invention approaches the pre-treatment module 10 and the post-treatment module 30. FIG. 9 is a detailed enlarged view of a part of FIG. 8. FIG. 10 is a diagram illustrating a part of FIG. 8 viewed downward from top. FIG. 11 is a diagram illustrating an area adjacent to a front end coupling part 23 of the cart treatment system 1 according to the embodiment of the present invention.

The intermediate module 20 may include the front end coupling part 23 that is coupled to the front end of the intermediate body 21. The intermediate module 20 may include a rear end coupling part 22 that is coupled to a rear end of the intermediate body 21. The pre-treatment module 10 may include the pre-treatment coupling part 13 that is coupled to the rear end of the pre-treatment body 11. The post-treatment module 30 may include a post-treatment coupling part 33 that is coupled to the front end of the post-treatment body 31.

In the coupled state, the pre-treatment coupling part 13 and the rear end coupling part 22 may couple the pre-treatment body 11 and the intermediate module 20. In the coupled state, the post-treatment coupling part 33 and the front end coupling part 23 may couple the pre-treatment body 31 and the intermediate module 20. That is, each coupling part may couple modules that are in contact with each other.

When transitioning from the detached state to the coupled state, the intermediate module 20 moves along a first direction, which is one of the left and right directions, and the second direction is set to be an opposite direction to the first direction. In one embodiment of the present invention, it is described that the first direction is described as right, and the second direction is left.

The pre-treatment coupling part 13 may be located on a first direction side of the rear end of the pre-treatment body 11, and the post-treatment coupling part 33 may be located on a first direction side of the rear end of the post-treatment body 31. The front end coupling part 23 may be located on a second direction side of the front end of the intermediate body 21, and the rear end coupling part 22 may be located on a second direction side of the rear end of the intermediate body 21. By arranging these coupling parts, when the intermediate module 20 moves and thus transitions from the detached state to the coupled state, collisions between each coupling part may not occur.

The pre-treatment coupling part 13 and the rear end coupling part 22 surround a boundary between the pre-treatment body 11 and the intermediate body 21, so that the pre-treatment module 10 and the intermediate module 20 may be coupled. The post-treatment coupling part 33 and the front end coupling part 23 surround a boundary between the post-treatment body 31 and the intermediate body 21, so the intermediate module 20 and the post-treatment module 30 may be coupled.

Specifically, the structure of the front end coupling part 23 illustrated in FIG. 11 will be described. The front end coupling part 23 may surround a portion of a front end flange 213 that protrudes to a radial outer side around the front end of the intermediate body 21 and is coupled to the front end flange 213, and in the coupled state, may be formed to surround a portion of a post-treatment flange 313 that protrudes to a radial outer side around the rear end of the post-treatment body 31. The front end coupling part 23 may be press-fitted to the front end flange 213, coupled through an adhesive, or coupled using a fastener. Since the front end flange 213 and the post-treatment flange 313 may be formed in an annular shape, the front end coupling part 23 may also have a shape of a part of an annulus when viewed along the front and back directions and have the same shape as a circumference of a semicircle.

In the specification of the present invention, the annular shape is not limited to a round ring, but collectively refers to a shape forming a closed curve. Therefore, the annular shape may include a round toroidal shape, a rectangular perimeter shape, a polygonal perimeter shape, a polygonal perimeter shape with rounded corners, etc.

The front end coupling part 23 has a 'U' shaped cross section and may surround the front end flange 213. The front end coupling part 23 may include a front end coupling rear end member 231 that contacts a rear surface of the front end flange 213, a front end coupling intermediate member 232 that extends forward from a front end coupling rear end member 231 and contacts a circumferential surface of the front end flange 213, and a front end coupling front end member 233 extending to a radial inner side and forming a front end coupling space 230 that is a space into which a front end of the front end coupling intermediate member 232 may be inserted together with the post-treatment flange 313 between a front surface of the front end flange 213. In the coupled state, the front end flange 213 and the post-treatment flange 313 are located in the space formed by the front end coupling part 23 and are surrounded by the front end coupling part 23, so that the intermediate module 20 and the post-treatment module 30 may be coupled. A pressing hole 234 is formed in a front end coupling front end member 233, so that a fastening member such as a bolt may be inserted to further press the flanges inserted thereinto.

The post-treatment coupling part 33 of the post-treatment module 30 may have the same configuration as the front end coupling part 23 described above, but has an opposite configuration in the front and back directions, and similarly, may be coupled by surrounding the front end flange 213 and the post-treatment flange 313. Therefore, the front end coupling part 23 and the post-treatment coupling part 33 may couple the intermediate module 20 and the post-treatment module 30. To ensure airtightness when the coupling is made, the front end coupling part 23 and the post-treatment coupling part 33 may be met to form one ring.

The pre-treatment coupling part 13 and the rear end coupling part 22 may have configurations that correspond to the configurations of the front end coupling part 23 and the post-treatment coupling part 33 described above, and may couple the pre-treatment flange 10 and the intermediate module 20 by surrounding a pre-treatment flange 113 and a rear end flange 212. Therefore, the descriptions of the pre-treatment coupling part 13 and the rear end coupling part 22 are the same or similar to the descriptions of the front end coupling part 23 and the post-treatment coupling part 33, and therefore, these descriptions will be replaced with the descriptions described above. For example, the pre-treatment flange 113 may also include a pre-treatment coupling rear end member, a pre-treatment coupling intermediate member, a pre-treatment coupling front end member, etc.

The pre-treatment door coupling part 52 and the inlet coupling part 12 may have configurations that correspond to the configurations of the front end coupling part 23 and the post-treatment coupling part 33 described above, and may couple the pre-treatment door 50 and the intermediate module 10 by surrounding the pre-treatment door flange 54 and the inlet flange 112. Accordingly, the descriptions of the pre-treatment door coupling part 52 and the inlet coupling part 12 are the same or similar to the descriptions of the front end coupling part 23 and the post-treatment coupling part 33, and therefore, these descriptions will be replaced with the descriptions described above.

The post-treatment door coupling part 62 and the outlet coupling part 32 may have configurations that correspond to the configurations of the front end coupling part 23 and the post-treatment coupling part 33 described above, and may couple the post-treatment door 60 and the post-treatment module 30 by surrounding a post-treatment flange and an outlet flange 312. Accordingly, the descriptions of the post-treatment door coupling part 62 and the outlet coupling part 32 are the same or similar to the descriptions of the front end coupling part 23 and the post-treatment coupling part 33, and therefore, these descriptions will be replaced with the descriptions described above.

Packing 70

FIG. 12 is a diagram illustrating an arrangement of a pre-treatment seal 251 in the intermediate module of the cart treatment system 1 according to the embodiment of the present invention. FIG. 13 is a diagram illustrating an arrangement of an inlet seal 151 in the pretreatment module 10 of the cart treatment system 1 according to the embodiment of the present invention. FIG. 14 is a diagram illustrating an arrangement of an outlet seal 351 in the post-treatment module 30 of the cart treatment system 1 according to the embodiment of the present invention. FIG. 15 is a diagram illustrating an arrangement of a post-treatment shutter seal 352 arranged in a post-treatment shutter 36 of the cart treatment system 1 according to the embodiment of the present invention.

The cart treatment system 1 according to the embodiment of the present invention may include a packing 70. The packing 70 is arranged at a boundary between components to maintain airtightness of the boundary.

Referring to the drawings, the intermediate module 20 may include a post-treatment seal, which is an annular packing 70 inserted into a groove formed in the front end flange 213, to maintain the airtightness of the boundary between the intermediate body 21 and the post-treatment module 30. The intermediate module 20 may include the pre-treatment seal 251, which is the annular packing 70 inserted into the groove formed in the rear end flange 212, to maintain the airtightness of the boundary between the intermediate body 21 and the pre-treatment module 10.

The pre-treatment module 10 may include an inlet seal 151, which is the packing 70 inserted into a groove formed in the inlet flange 112, to maintain airtightness of a boundary between the pre-treatment module 10 and the pre-treatment door 50. The post-treatment module 30 may include an outlet seal 351, which is the packing 70 inserted into a groove formed in the outlet flange 312, to maintain airtightness of a boundary between the post-treatment module 30 and the post-treatment door 60.

The pre-treatment module 10 may include a pre-treatment shutter 16. The pre-treatment shutter 16 may include a pre-treatment shutter covering part, a pre-treatment shutter housing in which a pre-treatment opening opened and closed by being selectively covered by the pre-treatment shutter covering part is formed, and a pre-treatment shutter seal, which is the packing 70 inserted into a groove formed around the pre-treatment opening, to maintain airtightness of a boundary between the pre-treatment shutter covering part and the pre-treatment shutter housing.

The post-treatment module 30 may include a post-treatment shutter 36. The post-treatment shutter 36 may include a post-treatment shutter covering part 361, post-treatment shutter housings 362 and 363 forming the post-treatment opening 360 opened and closed by being selectively covered by the post-treatment shutter covering part 361, and a post-treatment shutter seal 352, which is the packing 70 inserted into a groove formed around the post-treatment opening 360, to maintain airtightness of a boundary between the post-treatment shutter covering part 361 and the post-treatment shutter housings 362 and 363.

The pre-treatment seal 251, the post-treatment seal, the inlet seal 151, and the outlet seal 351 may be formed in a toroidal shape. The pre-treatment shutter seal and the post-treatment shutter seal 352 may be formed into a rectangular perimeter with rounded corners. The specific operations and configurations of the pre-treatment shutter 16 and the post-treatment shutter 36 will be described later in the description of FIGS. 23 to 26.

FIG. 16 is a cross-sectional view illustrating a state in which the packing 70 of the cart treatment system 1 according to the embodiment of the present invention contracts. FIG. 17 is a cross-sectional view illustrating a state in which the packing 70 of the cart treatment system 1 according to the embodiment of the present invention expands.

The packing 70 is made of an elastic material and may maintain airtightness as it adheres closely to each component at the boundary between components. The packing 70 may expand according to the inflow of air and adhere tightly to each component to maintain the airtightness. A fluid injected into the packing 70 may be a fluid other than air.

It is assumed that the packing 70 is arranged on a boundary between an installation target M2 and a pressed target M1. An installation target M2 is a target on which the packing 70 is installed, and the pressed target M1 is a target that the expanding packing 70 is intended to contact. Describing the post-treatment seal which is the packing 70 installed on the front end flange 213 as an example, the installation target M2 is the front end flange 213 of the intermediate body 21, and may allows the post-treatment seal to be inserted into the groove G1 formed in the front end flange 213 to press the post-treatment flange 313 of the post-treatment module 30 that is the pressed target M1. In addition, the rear end flange 212, the inlet flange 112, the outlet flange 312, the pre-treatment shutter housing, and the post-treatment shutter housing 362 and 363 may be the installation target M2, and the pre-treatment flange 113, the pre-treatment door flange 54, the post-treatment door flange, the pre-treatment shutter covering part, and the post-treatment shutter covering part 361 may be the pressed target M1.

The packing 70 may include an expansion part 71 and a sealing part 72. The expansion part 71 is a part that expands according to the injection of air. The expansion part 71 is inserted into an annular groove G1 formed on an outer side surface of the installation target M2. The groove G1 may be formed by digging an outer side surface of the installation target M2 along the front and back directions. Therefore, the expansion part 71 may be inserted into the groove G1 along the front and back directions.

The expansion part 71 includes an expansion space 710, into which air may flow, provided therein. The expansion space 710 may have a cross section with a narrow center based on the front and back directions in a cross section of the packing 70 along a direction perpendicular to the direction in which the packing 70 extends. The expansion part 71 forming the expansion space 710 may also have a shape with a narrow center like the expansion space 710. The expansion space 710 and the expansion part 71 of the packing 70 have this shape and are inserted into the groove, so that before and after the expansion occurs, the expansion along the protrusion direction (up and down directions in FIGS. 16 and 17) may mainly be generated rather than the expansion in the thickness direction (left and right directions in FIGS. 16 and 17).

A groove outer boundary **711*b* of the expansion space 710** may have a convex shape on the outer side of the groove. In addition, the groove outer boundary of the expansion space may also have a shape that is not flat but has a curved or bent section, such as a wave shape or a sawtooth shape.

The sealing part 72 is a part that may be connected to a side surface that faces an outer side of the groove G1 among the side surfaces of the expansion part 71, and may contact the pressed target M1. The sealing part 72 is pushed to the outside of the groove G1 by the expansion part 71 as the expansion part 71 expands to maintain the airtightness of the boundary between the installation target M2 and the pressed target M1, thereby pressing the pressed target M1. Unlike the expansion part 71, no part into which a fluid may flow and which may expand is present in the sealing part 72, thereby providing rigidity to the packing 70.

A thickness of the sealing part 72 may be smaller than a thickness of the expansion part 71. Therefore, a step may be formed at a boundary between the sealing part 72 and the expansion part 71. This step may be formed only on one side of the thickness direction (right side in FIGS. 16 and 17) as illustrated, or may be formed on both sides. A step is formed between the sealing part 72 and the expansion part 71, and a locking jaw M21 caught in a locking part 712, which is part of the sealing part 71 forming this step, is also formed in the groove G1 of the installation target M2, thereby preventing the packing 70 from deviating from the outside of the groove. Also, even if the sealing part 72 contacts the pressed target M1, but the side surface inside the groove of the expansion part 72 does not properly contact the side surface located on the inner side of the groove G1, the locking part 712 is caught in the locking jaw M21, so that the sealing may be achieved between packing 70 and the installation target M2.

Edges located at both ends of the sealing part 72 in the thickness direction may be chamfered or rounded. Depending on the shape of the sealing part 72, only both ends of the sealing part 72 in the thickness direction contact the pressed target M1 and the central part does not contact the pressed target M1, thereby preventing the situation where the maintenance of airtightness is poor.

The packing 70 according to the embodiment of the present invention may further include a nipple connected to the expansion part 71 to allow air to enter and exit the expansion space 710. The nipple is connected to an air providing means and communicates with the expansion space 710 to transmit air provided from the air providing means to the expansion space 710. The air accommodated in the expansion space 710 may be discharged to the outside through the nipple. Although the shape of the nipple is omitted in FIGS. 16 and 17, the nipple is formed in a form extending from the bottom to the top of the drawings, so that an upper end of the nipple may be coupled to the expansion part 71.

FIG. 18 is a diagram illustrating a cross section of a packing 70*b* and a structure of a nipple N1 according to a first modification of the embodiment of the present invention. FIG. 19 is a diagram illustrating an arrangement of nipple installation location P1 and P2 and a nipple fixing part N11 in the packing 70*b* according to the first modification of the embodiment of the present invention.

The packing 70*b* of the first modification includes the nipple fixing part N11. The nipple fixing part N11 is disposed between the expansion part 71*b* and the nipple N1 on the outer side of the boundary of the expansion space 710*b* to fix the nipple N1 to the expansion part 71*b*, and extends along the direction in which the expansion part 71*b* extends. Therefore, as illustrated in FIG. 19, the nipple fixing part N11 may also be formed in an annular shape like the expansion part 71*b*. The nipple fixing part N11 surrounds the circumference of the nipple N1 at the portion where the nipple N1 is arranged and is sandwiched between the expansion part 71*b* and the nipple N1, so that the nipple N1 may not easily be detached from the expansion part 71. The nipple fixing part N11 may be made of a stainless steel tape.

In the first modification, a side surface facing an outer side of a groove G2 of a sealing part 72*b* may be dug into the groove G2 inner side to form an irregularity 721*b*. Due to the formed irregularity 721*b*, even if the sealing part 72*b* is deformed in contact with the pressed target M1, the sealing part 72*b* may be easily maintained in the close contact with the pressed target M.

In the first modification, the packing fixing bolt included in the nipple N1 and the packing 70*b* may be arranged at the plurality of nipple installation locations P1 and P2 that are spaced apart from each other along the circumferential direction of the expansion part 71*b*. The nipple N1 may supply a fluid to the packing 70*b* as described above, and the packing fixing bolt may be used to fix the packing 70*b* so that the packing 70 is not detached from the groove G2 without supplying the fluid to the packing 70*b*. The nipple N1 may be connected to the fluid supply location P2 among the nipple installation locations P1 and P2, and the packing fixing bolt may be connected to the packing fixing location P1 among the nipple installation locations P1 and P2. The packing fixing location P1 may be arranged at portions that may correspond to each vertex when the packing 70*b* is viewed as a rectangle, and the fluid supply location P2 may be arranged at a portion corresponding to each edge of the packing 70*b*. However, another nipple may be connected to the packing fixing location P1 to supply a fluid to the packing 70*b*.

FIG. 20 is a diagram illustrating a cross section of a packing 70*c* and a structure of a nipple N2 according to a second modification of the embodiment of the present invention.

In the packing 70*c* of the second modification, unlike the first modification, the nipple fixing part N11 is not arranged. Therefore, a depth of a groove G3 may be shallower than in the first modification, and the expansion part 71*c* does not need to surround the nipple fixing part N11, so a length of the expansion part 71*c* along a depth direction may be smaller than that in the first modification. The nipple N2 also does not require fixing by nipple fixing part N11, so the part for fixing may be formed more simply than in the first modification. Shapes of an expansion space 710*c* and a sealing part 72*c* may be the same in the first and second modifications.

FIG. 21 is a diagram illustrating a cross section of a packing 70*d* and the structure of the nipple N2 according to a third modification of the embodiment of the present invention.

A thickness of the thickest part of an inner side end of a groove of an expansion part 71*d* of the packing 70*d* of the third modification may be greater than a thickness of the sealing part 72*d*. A thickness of an inner side end of the groove of the expansion part 71*d* may increase and then decrease toward an inner side of a groove G4. Therefore, the inner side end of the groove may include a portion where the thickness increases toward the inner side of the groove G4, and a portion where the thickness decreases toward the inner side of the groove G4 from the thickest part of the inner side end of the groove. To enable the inner side end of the groove of the expansion part 71*d* to be press-fitted, a fitting groove G41 having a shape corresponding to the shape of the inner side end of the groove may be formed on the inner side of the groove G4. However, a shape of an expansion space 710*d* may be the same as in other modifications, and the same nipple N2 as in other modifications may be used.

FIG. 22 is a diagram illustrating a cross section of a packing 70*e* and the structure of the nipple N1 according to a fourth modification of the embodiment of the present invention.

A thickness of the thickest part of an inner side end of a groove of an expansion part 71*e* of the packing 70*e* of the fourth modification may be greater than a thickness of the sealing part 72*e*. A thickness of an inner side end of a groove of an expansion part 71*e* may increase toward an inner side of a groove G5. To enable the inner side end of the groove of the expansion part 71*d* to be press-fitted, a fitting groove G51 having a shape corresponding to the shape of the inner side end of the groove may be formed on the inner side of the groove G5. In the fourth modification, the nipple N1 on which the nipple fixing part N11 may be arranged may be used in the same way as in the first modification.

Transfer Part

The cart treatment system 1 according to the embodiment of the present invention may include a transfer part. The transfer part may include a pre-treatment transfer member 142 arranged on the inner side of the pre-treatment module 10 for the transfer of the cart C. The transfer part may include an intermediate transfer member 242 arranged on the inner side of the intermediate module 20 for the transfer of the cart C. The transfer part may include a post-treatment transfer member 342 arranged on the inner side of the post-treatment module 30 for the transfer of the cart C. The pre-treatment transfer member 142, the intermediate transfer member 242, and the post-treatment transfer member 342 may be arranged to be spaced apart from each other along the front and back directions. The pre-treatment transfer member 142, the intermediate transfer member 242, and the post-treatment transfer member 342 may be each arranged along the front and back directions at a lower portion of an inner side of a pre-treatment support frame 141 of a pre-treatment support means 14, a rotation frame 241, and a post-treatment support frame 341 of a post-treatment support means 34, and may be composed of a conveyor belt capable of moving the cart C, which is seated on the top, along the front and back directions. However, when it is a device capable of moving a seated target, it is also possible for a configuration other than a conveyor belt to be used as a transfer part.

Shutters 16 and 36

FIG. 23 is a diagram illustrating a state in which the post-treatment shutter 36 of the cart treatment system 1 according to the embodiment of the present invention is closed, viewed from the front. FIG. 24 is a diagram illustrating a state in which the post-treatment shutter 36 according to the embodiment of the present invention is partially opened. FIG. 25 is a diagram illustrating a state in which a post-treatment shutter upper housing 362 is separated from a post-treatment shutter lower housing 363 according to an embodiment of the present invention. FIG. 26 is a diagram illustrating a state in which a post-treatment shutter covering part 361 is discharged to the outside in the state of FIG. 25.

Referring to the drawings, the cart treatment system 1 according to the embodiment of the present invention may include the pre-treatment shutter 16 and the post-treatment shutter 36. The pre-treatment module 10 may include the pre-treatment shutter 16 that selectively divides the internal space of the pre-treatment body 11 along the front and back directions. The post-treatment module 30 may include the post-treatment shutter 36 that selectively divides the internal space of the post-treatment body 31 along the front and back directions.

The pre-treatment shutter 16 may include a pre-treatment shutter covering part, a pre-treatment shutter lower housing in which a pre-treatment opening opened and closed by the pre-treatment shutter covering part is formed, and a pre-treatment shutter upper housing in which the pre-treatment shutter covering part is located when the pre-treatment opening is opened. The pre-treatment shutter upper housing may be detachedly coupled to an upper side of the pre-treatment shutter lower housing.

The post-treatment shutter 36 may include a post-treatment shutter covering part 361, a post-treatment shutter lower housing 363 in which a post-treatment opening 360 opened and closed by the post-treatment shutter covering part 361 is formed, and a post-treatment shutter upper housing 362 in which the post-treatment shutter covering part 361 is located when the post-treatment opening 360 is opened. The post-treatment shutter upper housing 362 may be detachedly coupled to an upper side of the post-treatment shutter lower housing 363.

In the following, the post-treatment shutter 36 will be described in detail. However, in the description of the post-treatment shutter 36, the front and back directions are reversed, and the target for which the shutter is formed may be changed from the post-treatment module 30 to the pre-treatment module 10 and applied directly to the pre-treatment shutter 16.

The post-treatment shutter lower housing 363 may include a post-treatment shutter lower plate 3631 that covers a portion of the internal space of the post-treatment module 30 and forms the post-treatment opening 360 and a post-treatment shutter lower protrusion 3632 that protrudes to an upper side of the post-treatment module 30. The post-treatment shutter upper housing 362 may be coupled to an upper side of the post-treatment shutter lower protrusion 3632. That is, the post-treatment shutter upper housing 362 may be arranged on an outer side of the post-treatment body 31. In a state in which the post-treatment shutter covering part 361 is detached from the post-treatment opening 360 to open the post-treatment opening 360, the post-treatment shutter covering part 361 may be located in the space inside the post-treatment shutter lower housing 363 and the post-treatment shutter upper housing 362.

The post-treatment shutter covering part 361 may include a plate-shaped post-treatment shutter covering plate 3611 and a post-treatment shutter rack 3612 formed on the post-treatment shutter covering plate 3611. The post-treatment shutter covering plate 3611 may be formed with lattice-shaped ribs for pressure resistance performance. The post-treatment shutter rack 3612 may be engaged with a post-treatment shutter gear 3641 included in a post-treatment shutter driving unit 364. The post-treatment shutter rack 3612 and the post-treatment shutter driving unit 364 may have a shape similar to a structure of a pinwheel 245 and a sprocket 2441 of the rotation means 24, which will be described later.

When a post-treatment shutter electric motor 3643 connected to the post-treatment shutter driving unit 364 gear through a post-treatment shutter driving shaft 3642 operates, the post-treatment shutter gear 3641 may rotate to raise and lower the post-treatment shutter covering part 361. The post-treatment shutter motor 3643 may be a device that receives power and produces driving force, such as a motor or actuator, and the post-treatment shutter driving shaft 3642 is a shaft member that is arranged on an upper side of the post-treatment opening 360 so as to rotate in the left and right axial directions by receiving the driving force generated by the post-treatment shutter motor 3643.

The post-treatment shutter covering part 361 may include a post-treatment shutter guide roller 3613. The post-treatment shutter guide roller 3613 is arranged adjacent to a circumference of the post-treatment shutter covering plate 3611 and may slide along a post-treatment shutter guide rail 365 arranged along the up and down directions to be adjacent to the post-treatment opening 360. By the action of the post-treatment shutter guide roller 3613 and the post-treatment shutter guide rail 365, the raising and lowering of the post-treatment shutter covering part 361 may be guided so that the post-treatment shutter covering part 361 is not detached from the post-treatment opening 360. As illustrated, the post-treatment shutter guide rail 365 may be arranged one by one on the left and right sides of the post-treatment opening 360, and four post-treatment shutter guide rollers 3613 may be arranged at each corner of the post-treatment shutter covering plate 3611 in the up and down directions and left and right directions, but the number and arrangement are not limited thereto.

The post-treatment shutter upper housing 362 may be detachably coupled to the post-treatment shutter lower housing 363. After detaching the post-treatment shutter upper housing 362 from the post-treatment shutter lower housing 363 as illustrated in FIG. 25, as illustrated in FIG. 26, the post-treatment shutter covering part 361 may move upward to detach the post-treatment shutter covering part 361 from the post-treatment shutter lower housing 363. After the maintenance is completed, the post-treatment shutter covering part 361 may be inserted into the post-treatment shutter lower housing 363 in the downward direction, and the post-treatment shutter upper housing 362 may be coupled to the post-treatment shutter lower housing 363. Since the post-treatment shutter 36 has this detachable structure, the post-treatment shutter covering part 361 and the post-treatment shutter upper housing 362 may be easily managed.

Rotation Means 24 and Fixing Means 26

FIG. 27 is a perspective view illustrating a state of the rotation means 24 and the cart C before the cart C is fixed by a fixing means 26 according to an embodiment of the present invention. FIG. 28 is a diagram illustrating the state of FIG. 27 viewed from the front.

Referring to the drawings, the cart treatment module of the cart treatment system 1 according to the embodiment of the present invention may include the rotation means 24 and the fixing means 26. In one embodiment of the present invention, the cart treatment module may be the intermediate module 20. In this case, the module for the pre-treatment of the cart C may be the pre-treatment module 10, the module for the post-treatment of the cart C may be the post-treatment module 30, and the treatment body of the cart treatment module may be the intermediate body 21. Hereinafter, the intermediate module 20 will be described as the cart treatment module.

The fixing means 26 is provided to fix the cart C that has entered an inner side of the intermediate body 21. The rotation means 24 is provided to rotate the cart C, which is fixed by the fixing means 26, relative to the intermediate body 21 with the front and back directions as an axis. In other words, the direction in which the cart C moves within the cart treatment system 1 may match the axis direction in which the cart C rotates by the rotation means 24. The fixing means 26 serves to fix the cart C to the rotation means 24 so that the cart C is not detached or products in the cart C are not detached when rotating by the rotation means 24.

The rotation means 24 may include a rotation frame 241. The rotation frame 241 is a frame that has a rotation space provided therein, which is a space provided for the cart C to enter. The appearance of the rotation frame 241 may be cylindrical, but does not need to have a cylindrical shape as a whole, and may have the same shape as a cylindrical frame by allowing the rotation frame 241 to include a plurality of disc-shaped members that have an opening at a center into which the cart C may be inserted and are arranged to be spaced apart along the front and back directions and a plurality of connecting ribs that connect the disc-shaped members along the front and back directions. The pre-treatment support frame 141 of the pre-treatment module 10 and the post-treatment support frame 341 of the post-treatment module 30 may have a similar shape to the rotation frame 241.

The connecting rib may be arranged adjacent to an opening of the disc-shaped member. A transfer auxiliary roller 243 may be rotatably coupled to the inner side of the connecting rib. Since the intermediate transfer member 242, which is a transfer member of the cart C, may be arranged adjacent to the opening of the disk-shaped member, the transfer auxiliary roller 243 may assist in transferring the cart C by the intermediate transfer member 242. The plurality of transfer auxiliary rollers 243 may be arranged to be freely rotatable. The transfer auxiliary roller 243 may be arranged on at least one of the upper, lower, left, and right sides of the opening of the disc-shaped member. The pre-treatment support means 14 and the post-treatment support means 34 may have a similar configuration to the transfer auxiliary roller 243.

FIG. 29 is a perspective view illustrating the state in which the cart C is fixed by the fixing means 26 according to the embodiment of the present invention. FIG. 30 is a perspective view of the fixing means 26 of the cart treatment system 1 according to the embodiment of the present invention.

The fixing means 26 may include a fixed operating unit 262 and a fixed driving unit 261 for operating the fixed operating unit 262. The fixed operating unit 262 and the fixed driving unit 261 may be spaced apart from each other or may be in contact with each other. The fixed operating unit 262 may be coupled to the rotation means 24 and rotate according to the rotation of the rotation means 24, but the fixed driving unit 261 may be coupled to the intermediate body 21 and may not be affected by the rotation of the rotation means 24. When the fixed driving unit 261 operates the fixed operating unit 262, the fixed driving unit 261 contacts the fixed operating unit 262, and when the fixed driving unit 261 does not change the state of the fixed operating unit 262 and the cart C rotates by the rotation means 24, the fixed driving unit 261 and the fixed operating unit 262 may be separated from each other.

The fixed operating unit 262 is selectively put in either the fixed state or the unlocked state. In the fixed state, as the fixed operating unit 262 is deformed by the fixed driving unit 261, the fixed operating unit 262 presses the cart C, which has entered the inner side of the intermediate body 21, and is clamped between the rotation means 24 and fixed. In the unlocked state, the fixed operating unit 262 is detached from the cart C, so that the cart C may move along the front and back directions and may be detached from the rotation means 24.

The fixed driving unit 261 is provided to detachedly contact the fixed operating unit 262 and transition the state of the fixed operating unit 262. In other words, by the operation of the fixed driving unit 261, the fixed operating unit 262 may transition from the fixed state to the unlocked state, or from the unlocked state to the fixed state.

The fixed operating unit 262 according to the embodiment of the present invention may have a link structure. Specifically, the fixed operating unit 262 may include a four-shaft link 2622, a toggle link 2624, and a pressing plate 2621. The four-shaft link 2622 is a part formed by coupling four links in a diamond shape, and may be coupled to the rotation frame 241 to be coupled to a fixing member 2623 that does not move relative to the rotation frame 241. When an upper end of the four-shaft link 2622 is pressed downward by a link operating member included in the fixed driving unit 261, a gap between left and right ends of the four-shaft link 2622 is widened while a gap between upper and lower ends of the four-shaft link 2622 is narrowed. When the upper end of the four-shaft link 2622 is pressed downward again by the fixed driving unit 261 while the gap between the upper and lower ends of the four-shaft link 2622 is narrowed, the gap between the left and right ends of the four-shaft link 2622 is narrowed while the gap between the upper and lower ends of the four-shaft link 2622 is restored. To enable this recovery operation, an elastic member such as a spring connecting each link and a locking structure for each link may be disposed within the four-shaft link 2622.

The toggle link 2624 is connected to the left and right ends of the four-shaft link 2622 to rotate according to the operation of the four-shaft link 2622. The toggle link 2624 is configured to push the pressing plate 2621 connected to a lower end of the toggle link 2624 downward when the gap between the left and right ends of the four-shaft link 2622 is widened and perform a toggle operation like a toggle clamp that is fixed in that state. When the gap between the left and right ends of the four-shaft link 2622 is narrowed, the pressing plate 2621 moves upward.

The pressing plate 2621 is a plate that presses the cart C downward, and in the fixed state, the pressing plate 2621 is lowered to press the cart C, and in the unlocked state, the pressing plate 2621 is raised and detached from the cart C. The pressing plate 2621 presses the cart C against the rotation means 24. In the state in which the cart C is seated on the inner side surface of the rotation means 24, the pressing plate 2621 is pressed, and the cart C may be clamped and fixed between the pressing plate 2621 and the inner side surface of the rotation means 24.

The link operating member included in the fixed driving unit 261 may be an air cylinder capable of moving in the up and down directions, but any device that may press the link structure through the raising and lowering can be used as the link operating member.

In one embodiment of the present invention, the four-shaft link 2622 is described as being able to expand or contract along the left and right directions, but the four-shaft link 2622 may be arranged to expand or contract along the front and back directions.

FIG. 31 is a perspective view illustrating a situation in which the cart rotates while the cart C is fixed by the fixing means 26 according to the embodiment of the present invention. FIG. 32 is a diagram illustrating the state of FIG. 31 viewed from the front. FIG. 33 is a diagram illustrating a rotation driving unit 244 of the cart treatment system 1 according to the embodiment of the present invention.

The rotation means 24 may include a pinwheel 245 that is coupled to the rotation frame 241 to rotate the rotation frame 241. The pinwheel 245 may be formed in such a way that a plurality of pins are arranged to be spaced apart along a circumferential direction of the wheel. Not all pins are illustrated in FIGS. 27 and 31, and the structure of the pin and wheel can be seen in FIG. 33. The wheel of the pinwheel 245 may be arranged to be spaced apart from the disc-shaped members of the rotation frame 241 in the front and back directions, and may be connected to the disc-shaped members by the connecting rib. Therefore, the cart C may pass through the center of the pinwheel 245. A plurality of pins may be coupled to the wheel so as to be able to rotate axially in the front and back directions. Therefore, excessively strong force is prevented from being applied to the pin by the sprocket 2441, thereby preventing damage or wear of the pin and sprocket 2441.

The rotation means 24 may include the rotation driving unit 244. The rotation driving unit 244 rotates the rotation frame 241 relative to the intermediate body 21 with the front and back directions as an axis. The rotation driving unit 244 may be accommodated inside the protruding body 217.

The rotation driving unit 244 may include the sprocket 2441 that engages with the pinwheel 245 to rotate the pinwheel 245 as it rotates and rotates so that the front and back directions are rotatable axially. The sprocket 2441 may be arranged on the outer side of the pinwheel 245. The rotation driving unit 244 may include a rotary drive electric motor 2442 that transmits driving force for rotation to the sprocket 2441. The rotary drive electric motor 2442 may be a device that receives power and produces driving force, such as a motor or an actuator.

In the tooth shape of the sprocket 2441, a space between each tooth is larger than the space occupied by the pin of the pinwheel 245, so it may be formed to have room. Therefore, even if there is a deviation between the sprocket 2441 and the pinwheel 245 due to the expansion of the device, etc., the sprocket 2441 and the pinwheel 245 may be maintained in the engaged state.

Although it has been described that all components configuring the embodiment of the present invention are combined with each other as one component or are combined and operated, the present invention is not necessarily limited to the abovementioned embodiment. That is, all the components may also be selectively combined and operated as one or more components without departing from the scope of the present invention. In addition, the term "include", "configure", "have", or the like, described above is to be interpreted to imply the inclusion of other components rather than the exclusion of other components, since they mean that a corresponding component may be included unless particularly described otherwise. Unless defined otherwise, all the terms including technical and scientific terms have the same meaning as meanings generally understood by those skilled in the art to which the present disclosure pertains. Generally used terms such as terms defined in a dictionary should be interpreted as the same meanings as meanings within a context of the related art and should not be interpreted as ideally or excessively formal meanings unless clearly defined in the present invention.

The above description is merely an illustrative explanation of the spirit of the present invention, and various modifications and variations may be made by those skilled in the art without departing from the essential characteristics of the present invention. Accordingly, exemplary embodiments disclosed in the present invention are not to limit the spirit of the present invention, but are to describe the spirit of the present invention. The scope of protection of the present invention is not limited to these exemplary embodiments. The scope of protection of the present invention should be interpreted by the following claims, and it should be interpreted that all the spirits equivalent to the following claims fall within the scope of rights of the present invention.

The invention claimed is:

1. A cart treatment system, comprising:

a pre-treatment module for cart treatment;

an intermediate module provided to receive and treat the cart which is treated in the pre-treatment module; and a post-treatment module provided to receive and treat the cart which is treated in the intermediate module, wherein the intermediate module is provided to be put in either a coupled state in which the intermediate module is coupled to the pre-treatment module and the post-treatment module or a detached state in which the intermediate module is detached from the pre-treatment module and the post-treatment module, wherein the intermediate module includes:

an intermediate body having an internal space through which the cart passes, the internal space being opened along the front and rear directions, a front end coupling part coupled to a front end of the intermediate body, and a rear end coupling part coupled to a rear end of the intermediate body, wherein the pre-treatment module includes a pre-treatment body having an internal space where the cart is treated, and a pre-treatment coupling part coupled to a front end of the pre-treatment body, wherein the post-treatment module includes a post-treatment body having an internal space where the cart is treated, and a post-treatment coupling part coupled to a rear end of the post-treatment body, wherein in the coupled state, the pre-treatment coupling part and the rear end coupling part couple the pre-treatment body and the intermediate module, and the post-treatment coupling part and the front end coupling part couple the post-treatment body and the intermediate module, wherein the pre-treatment coupling part surrounds a portion of a pre-treatment flange formed at the front end of the pre-treatment body, being coupled to the pre-treatment flange, and surrounds a portion of a rear end flange formed at the rear end of the intermediate body in the coupled state, and wherein the rear end coupling part surrounds a remaining portion of the rear end flange, being coupled to the rear end flange, and surrounds a remaining portion of the pre-treatment flange in the coupled state.

2. The cart treatment system of claim 1, wherein the pre-treatment module, the intermediate module, and the post-treatment module are arranged in order while moving forward, and wherein when transitioning from the coupled state to the detached state, the intermediate module is detached from the pre-treatment module and the post-treatment module along directions crossing front and rear directions.

3. The cart treatment system of claim 1, wherein when transitioning from the detached state to the coupled state, in a case where the intermediate module moves along a first direction which is one of left and right directions, the pre-treatment coupling part is located on a first direction side of the front end of the pre-treatment body, and the post-treatment coupling part is located on a first direction side of the rear end of the post-treatment body, the front end coupling part is located on a second direction side that is an opposite side to a first direction side of the front end of the intermediate body, and the rear end coupling part is located on a second direction side of the rear end of the intermediate body, and the pre-treatment coupling part and the rear end coupling part surround a boundary between the pre-treatment body and the intermediate body, and the post-treatment coupling part and the front end coupling part surround a boundary between the post-treatment body and the intermediate body.

4. The cart treatment system of claim 1, wherein the pre-treatment coupling part includes:

a pre-treatment coupling rear end member contacting a rear surface of the pre-treatment flange, a pre-treatment coupling intermediate member extending forward from the pre-treatment coupling rear end member and contacting a circumferential surface of the pre-treatment flange, and a pre-treatment coupling front end member extending radially inward from a front end of the pre-treatment coupling intermediate member to form a space into which the rear end flange is inserted together with the pre-treatment coupling intermediate member between a front surface of the pre-treatment flange.

5. The cart treatment system of claim 1, wherein the pre-treatment module further includes a pre-treatment shutter selectively dividing the internal space of the pre-treatment body along front and rear directions, and wherein the post-treatment module further includes a post-treatment shutter selectively dividing the internal space of the post-treatment body along the front and rear directions.

6. The cart treatment system of claim 5, wherein the pre-treatment shutter includes a pre-treatment shutter covering part, a pre-treatment shutter lower housing in which a pre-treatment opening opened and closed by the pre-treatment shutter covering part is formed, and a pre-treatment shutter upper housing in which the pre-treatment shutter covering part is located when the pre-treatment opening is opened, wherein the pre-treatment shutter upper housing is detachedly coupled to an upper side of the pre-treatment shutter lower housing.

7. The cart treatment system of claim 1, further comprising:

a module movement device that is coupled to the intermediate module to move the intermediate module so that the intermediate module is put in either the coupled state or the detached state.

8. The cart treatment system of claim 7, wherein the module movement device includes a moving rail to which the intermediate module is slidably coupled.

9. The cart treatment system of claim 1, further comprising:

a transfer part including:

a pre-treatment transfer member arranged inside the pre-treatment module to transfer the cart;

an intermediate transfer member arranged inside the intermediate module to transfer the cart; and a post-treatment transfer member arranged inside the post-treatment module to transfer the cart.

10. The cart treatment system of claim 9, wherein the pre-treatment transfer member, the intermediate transfer member, and the post-treatment transfer member are arranged to be spaced apart along the front and rear directions.

11. The cart treatment system of claim 1, wherein the pre-treatment body includes a system inlet which is opened along the front and rear directions at a rear end thereof, and an inlet coupling part installed at the rear end of the pre-treatment body, wherein the cart treatment system further comprises a pre-treatment door including a pre-treatment door covering part which is arranged adjacent to the rear end of the pre-treatment body to open and close the system inlet, and a pre-treatment door coupling part installed on the pre-treatment door covering part, and wherein the inlet coupling part and the pre-treatment door coupling part couple the pre-treatment module and the pre-treatment door when the pre-treatment door covering part closes the system inlet.

12. The cart treatment system of claim 11, wherein the pre-treatment door further includes a pre-treatment door support part to which the pre-treatment door covering part is coupled so as to be able to rotate axially in the front and rear directions when opening and closing the system inlet.

13. The cart treatment system of claim 1, the intermediate body includes a hard treatment body divided into two parts and a soft treatment body made of an expandable or stretchable material and connecting the two divided parts of the hard treatment body.

* * * * *